Dec. 6, 1960 F. R. MARINDIN 2,962,846
CAP ASSEMBLING AND APPLYING APPARATUS
Filed Aug. 16, 1954 16 Sheets-Sheet 10

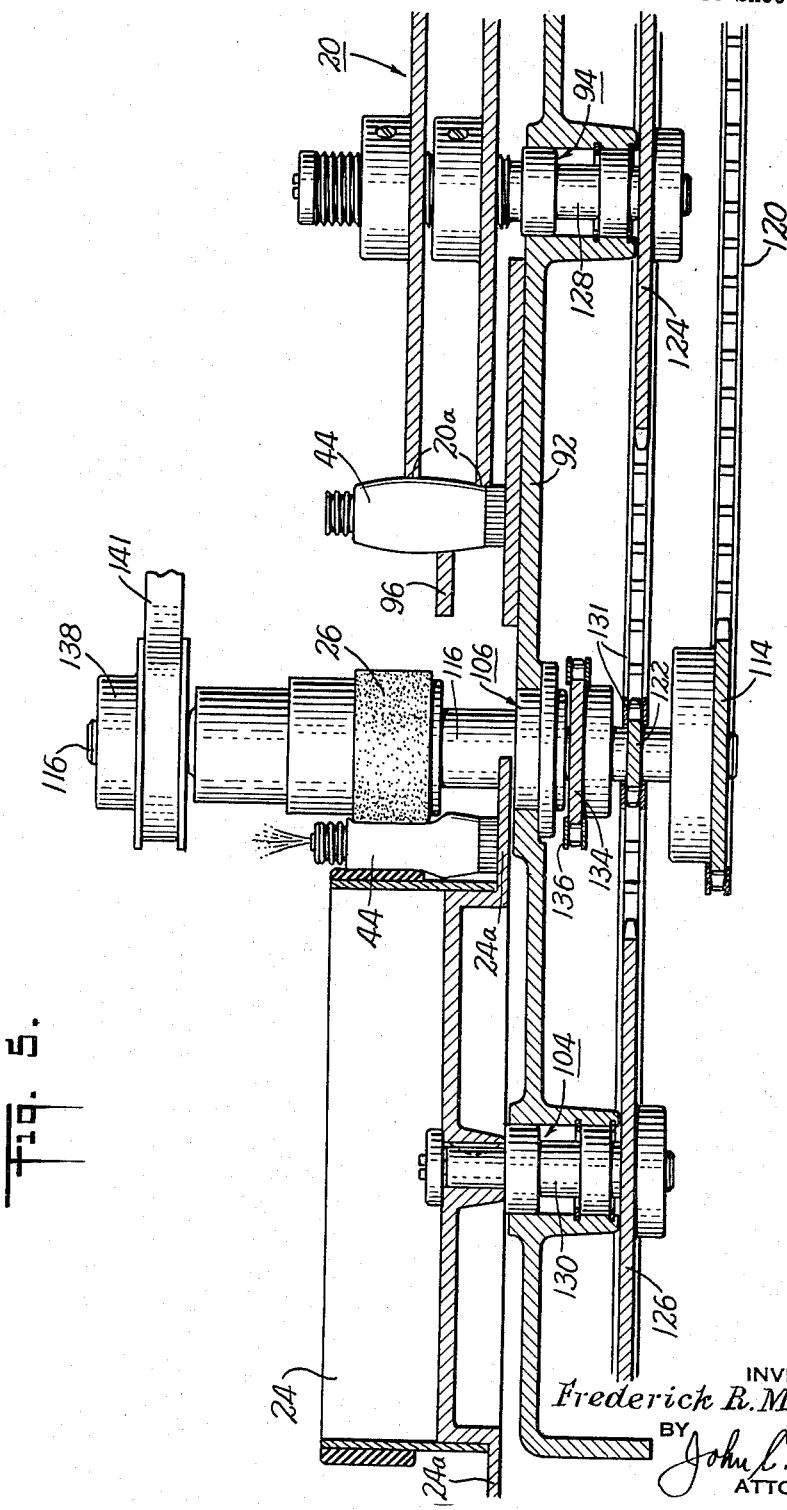

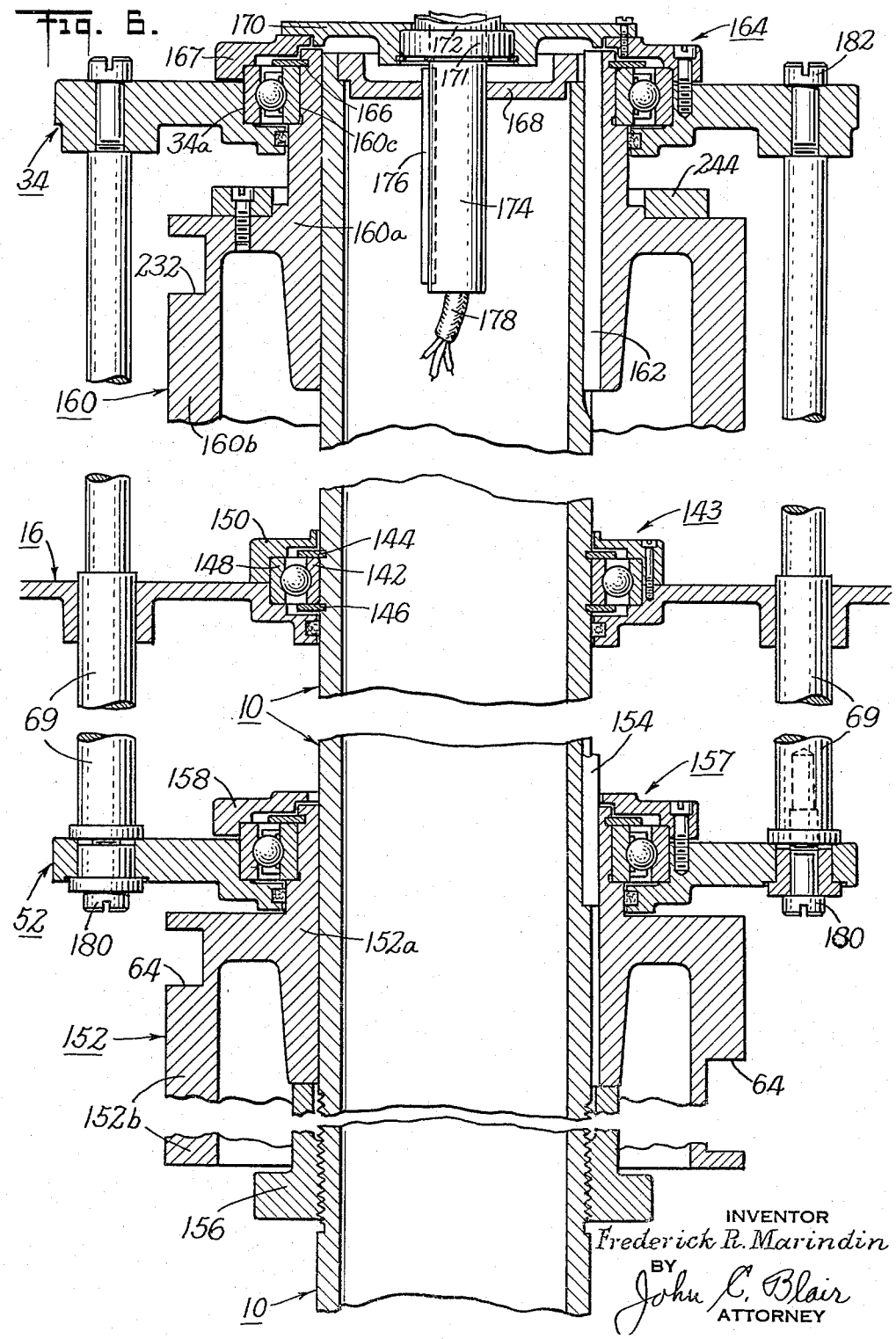

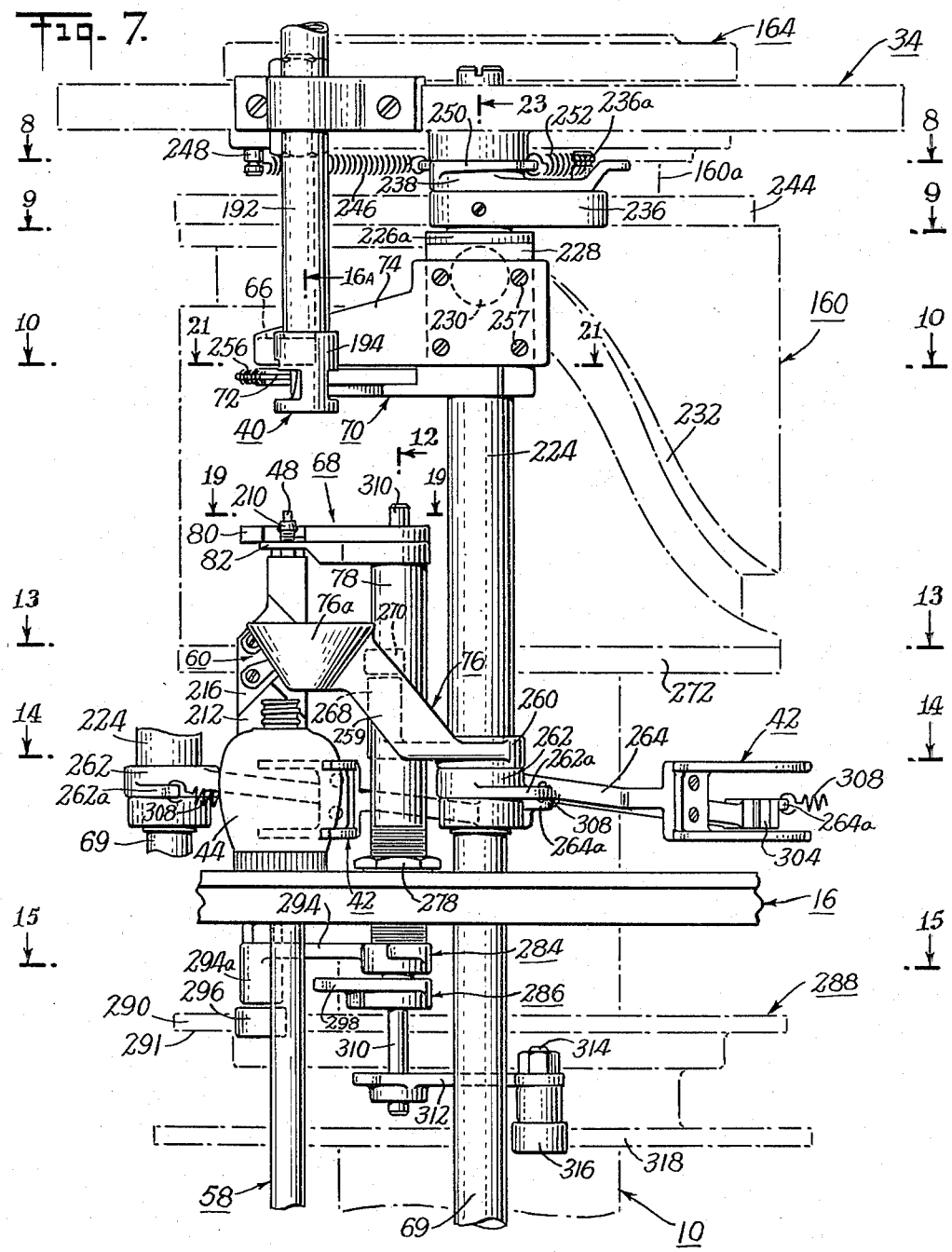

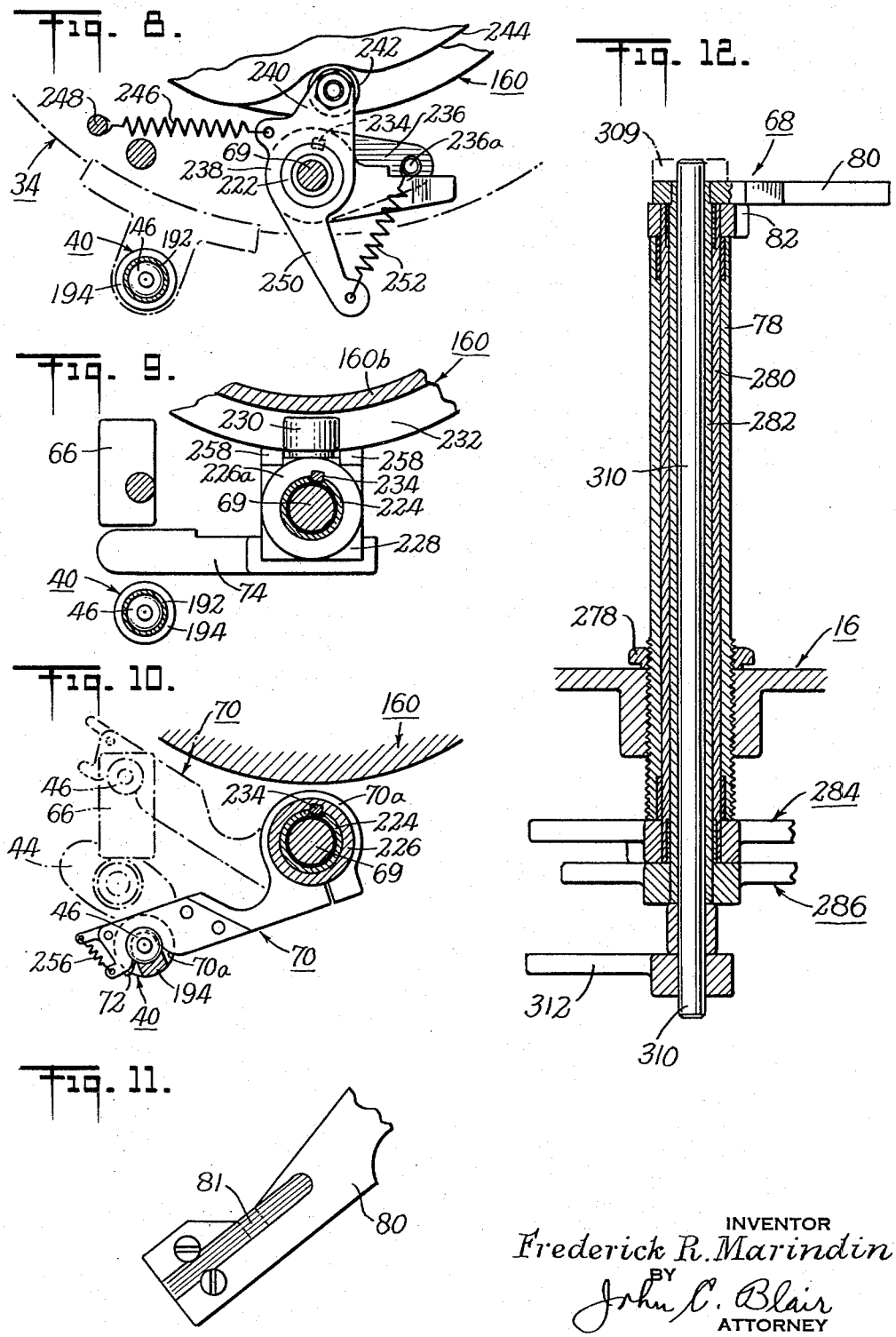

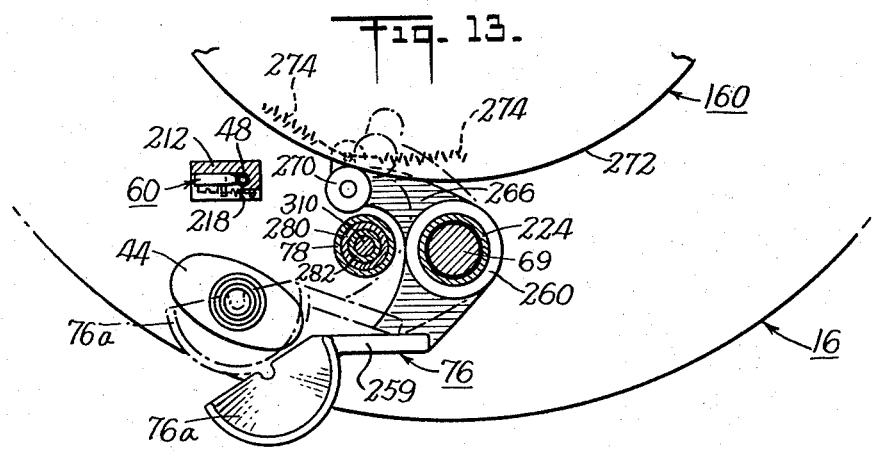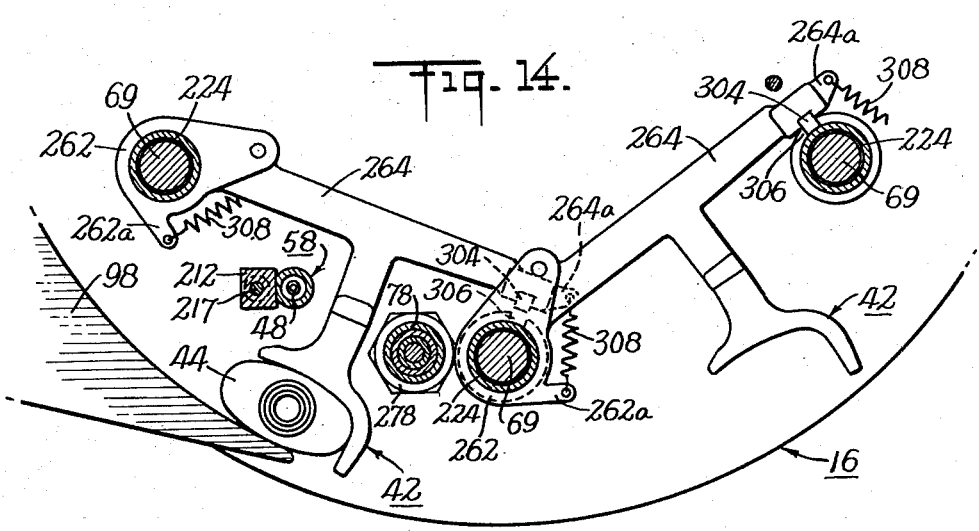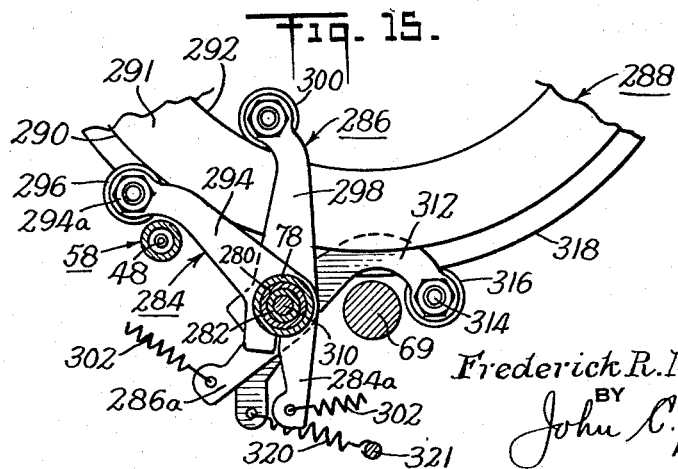

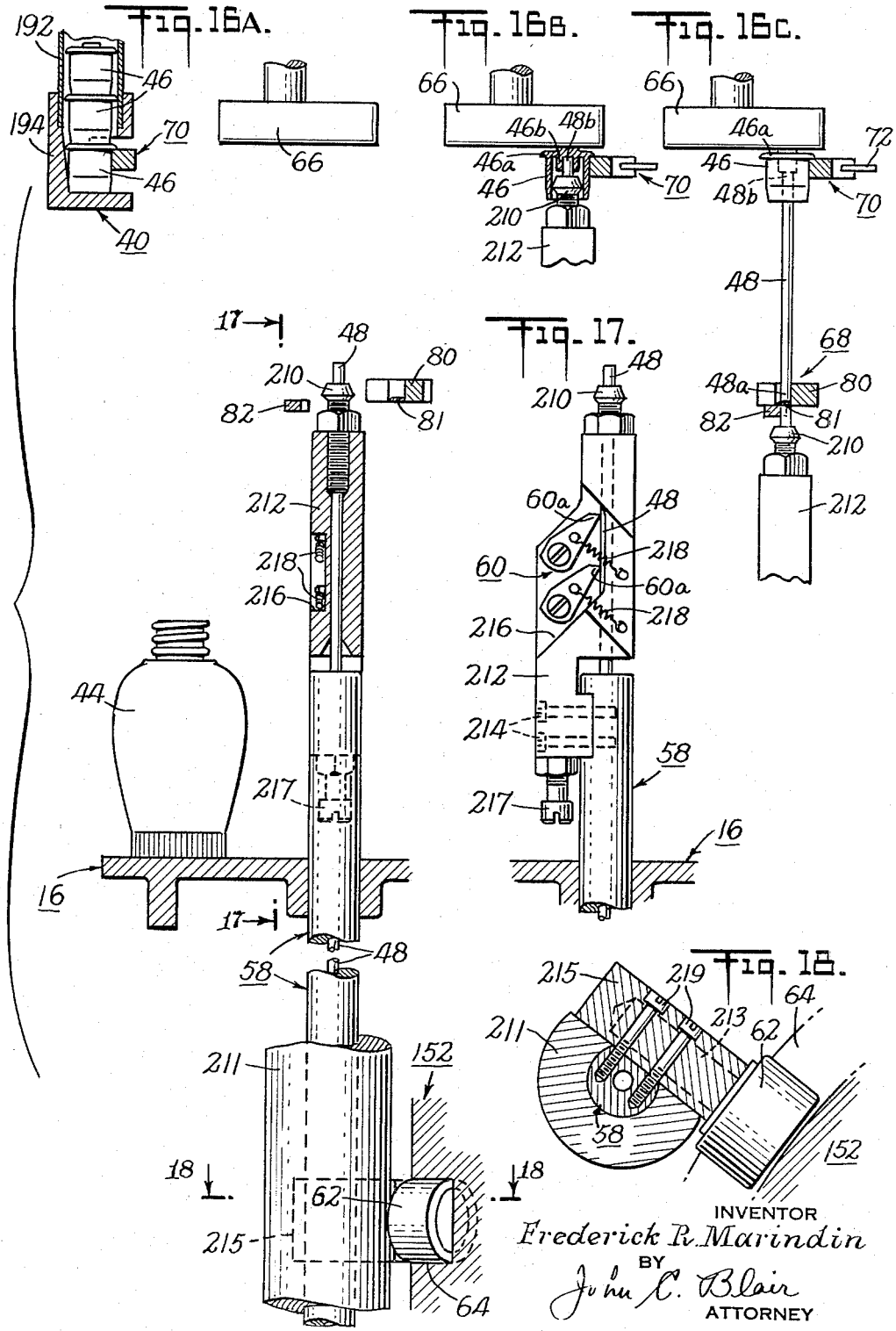

INVENTOR
Frederick R. Marindin
BY
John C. Blair
ATTORNEY

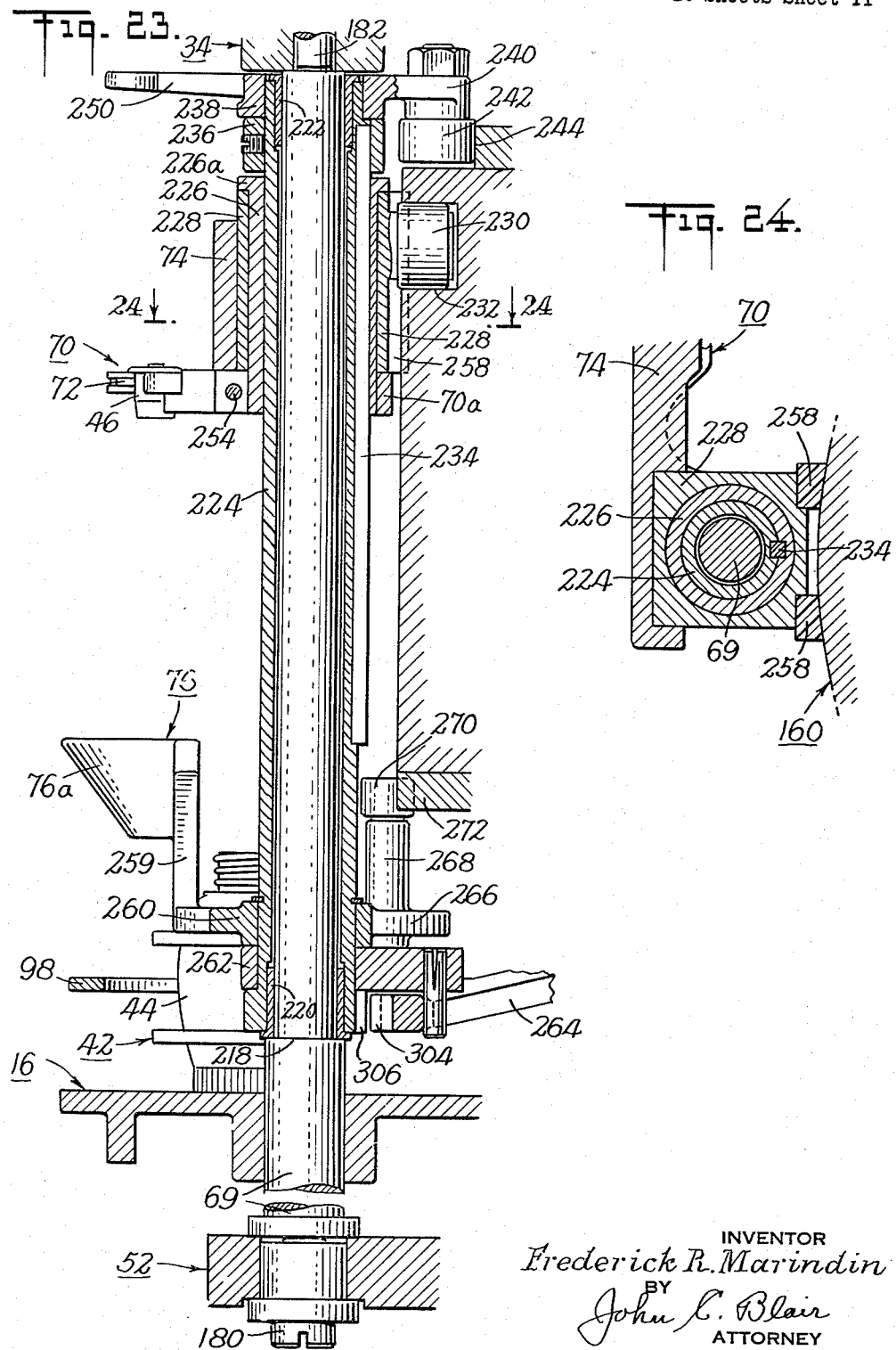

Dec. 6, 1960 F. R. MARINDIN 2,962,846
CAP ASSEMBLING AND APPLYING APPARATUS
Filed Aug. 16, 1954 16 Sheets-Sheet 12

INVENTOR
Frederick R. Marindin
BY
John C. Blair
ATTORNEY

Dec. 6, 1960   F. R. MARINDIN   2,962,846
CAP ASSEMBLING AND APPLYING APPARATUS
Filed Aug. 16, 1954   16 Sheets-Sheet 13
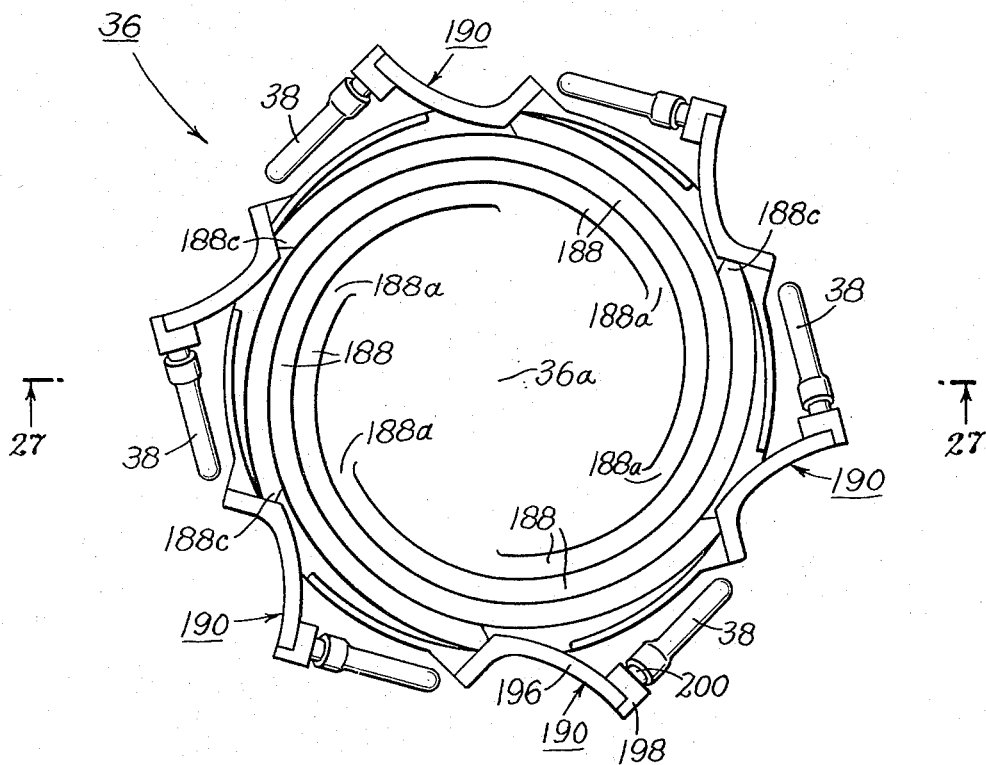
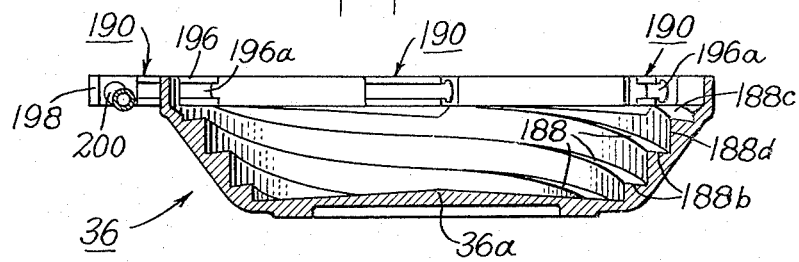
INVENTOR
Frederick R. Marindin
BY
John C. Blair
ATTORNEY Dec. 6, 1960   F. R. MARINDIN   2,962,846
CAP ASSEMBLING AND APPLYING APPARATUS
Filed Aug. 16, 1954   16 Sheets-Sheet 14
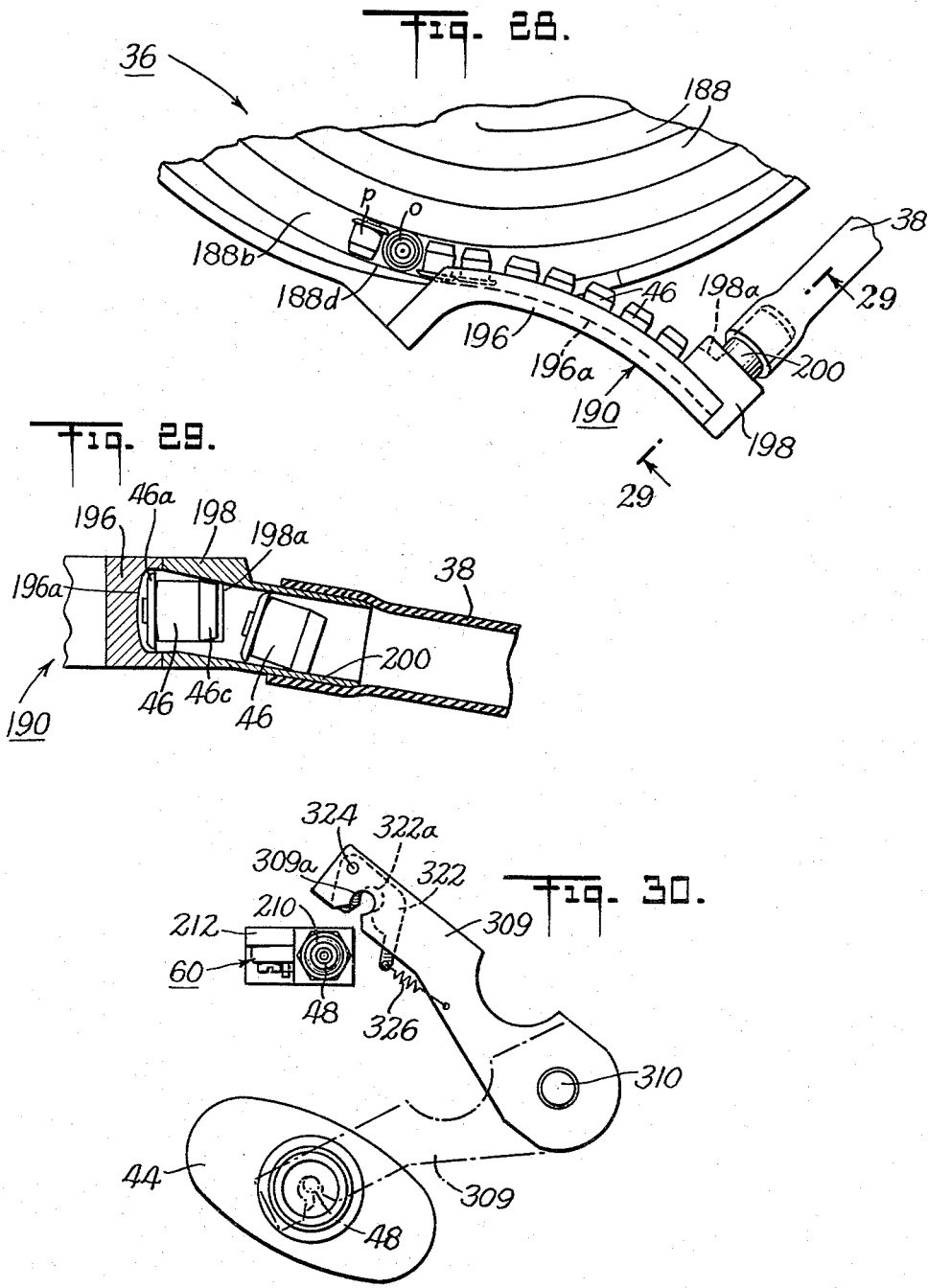
INVENTOR
Frederick R. Marindin
BY John C. Blair
ATTORNEY

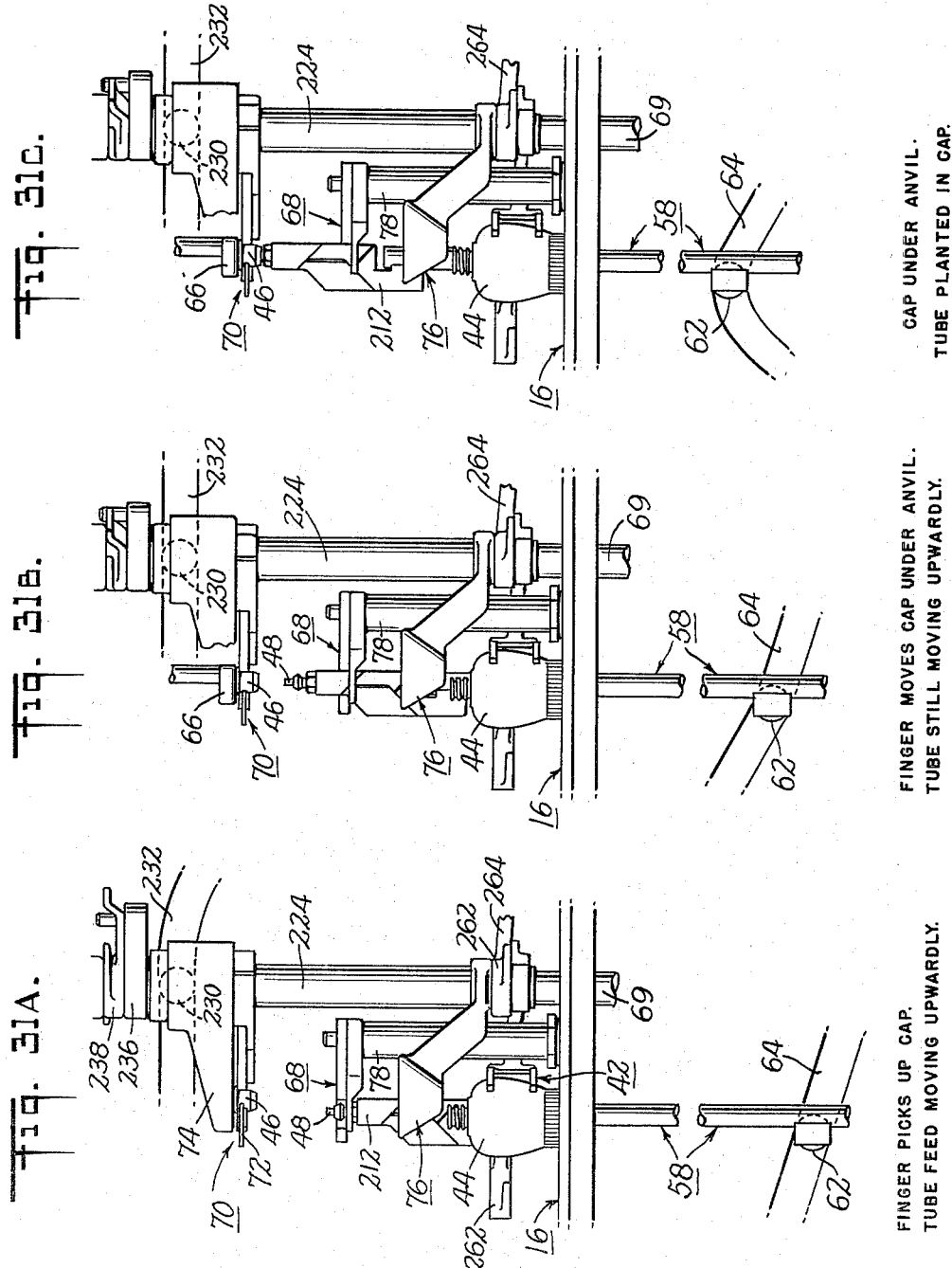

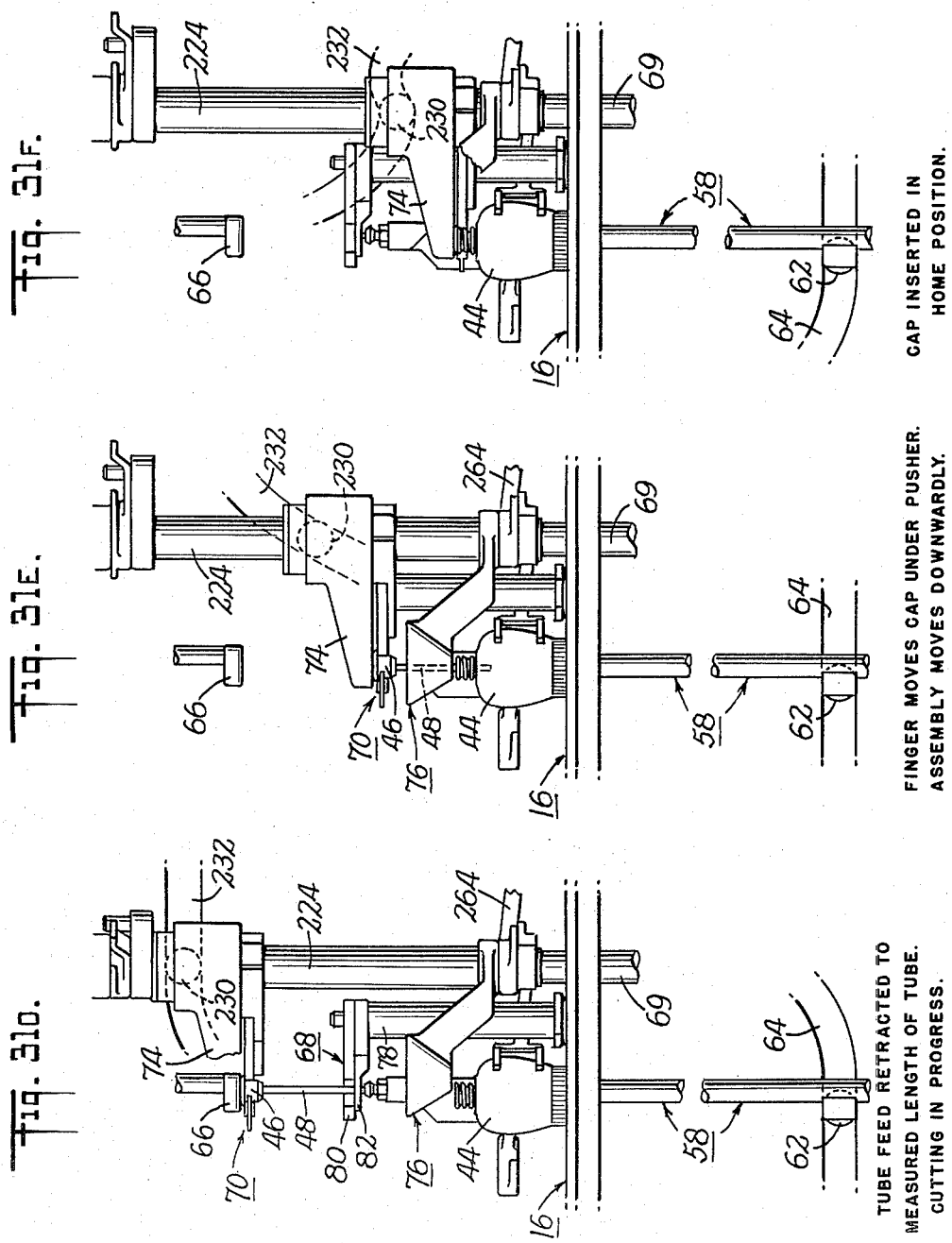

United States Patent Office 2,962,846
Patented Dec. 6, 1960

2,962,846

CAP ASSEMBLING AND APPLYING APPARATUS

Frederick R. Marindin, Bethel, Conn., assignor to Doran Brothers, Incorporated, Danbury, Conn.

Filed Aug. 16, 1954, Ser. No. 450,122

18 Claims. (Cl. 53—67)

This invention relates to a container capping machine, and, more particularly, to a machine designed for first assembling atomizing caps and then applying such caps to containers, i.e. bottles made of pliable material such as polyethylene or the like, such a machine may first assemble a tube in the atomizing valve of a plug-cap and then insert such cap in a container, here illustratively described as a bottle.

One of the objects of this invention is to provide a container capping machine which is simple in construction and thoroughly reliable and practical in operation. Another object is to provide a machine of the above character which is particularly suited for applying caps to containers made from pliable material or the like. Another object is to provide a machine of the above character which will apply caps having aspirating apparatus including a tube extending from the bottom of the caps to containers such as bottles. Another object of the above invention is to provide a machine of the above character which will reliably seat a length of tube in the aspirating valve in a cap and then insert the tube and cap in the neck of a pliable container whereby liquid may be aspirated from the cap upon squeezing thereof. Another object is to provide a machine of the above character which is completely automatic in all respects in that it takes containers from a feed line, assembles caps and aspirating apparatus, applies the caps to the containers, test squeezes each container and then returns such containers to the line, all without any manual assistance. Other objects will be in part obvious and in part pointed out hereinafter.

The invention accordingly comprises the features of construction, combinations of elements, and arrangements of parts, which will be exemplified in the construction hereinafter set forth, and the scope of the invention will be indicated in the claims.

For a fuller understanding of the nature and the objects of the invention, reference should be had to the following detailed description taken in connection with the accompanying drawings, in which:

Figure 5 is a fragmentary enlarged vertical sectional view taken along the line 5—5 of Figure 2.

Figure 6 is an enlarged fragmentary vertical sectional view and showing the details of the central portion of the machine particularly the cage structure for supporting the bottle-operating parts;

Figure 7 is a fragmentary enlarged vertical elevation of the valve assembling and cap-inserting apparatus at one station of the machine and taken generally along the line 7—7 of Figure 2;

Figure 8 is a fragmentary horizontal sectional view taken along the line 8—8 of Figure 7;

Figure 9 is a fragmentary horizontal sectional view taken along the line 9—9 of Figure 7;

Figure 10 is a fragmentary horizontal sectional view taken along the line 10—10 of Figure 7;

Figure 11 is a plan view of one of the tube cutting elements of the machine, herein referred to as the "knife member";

Figure 12 is a fragmentary vertical sectional view taken along the line 12—12 of Figure 7;

Figure 13 is a fragmentary horizontal sectional view taken along the line 13—13 of Figure 7;

Figure 14 is a fragmentary horizontal sectional view taken along the line 14—14 of Figure 7;

Figure 15 is a fragmentary horizontal sectional view taken along the line 15—15 of Figure 7;

Figure 16A is a fragmentary elevation, partially in section, taken along the line 16A—16A of Figure 7;

Figure 16B is a fragmentary elevation, partially in section, of some of the parts shown in Figure 16A just after a tube has been inserted in an aspirating valve of a cap;

Figure 16C is a fragmentary elevation of some of the parts shown in Figures 16A and 16B as they appear when the cutting mechanism is severing a length of tube prior to insertion in the cap of a bottle;

Figure 17 is a fragmentary elevation of a portion of the tube-inserting apparatus taken along the line 17—17 of Figure 16A;

Figure 18 is a fragmentary horizontal section taken along the line 18—18 of Figure 16A and showing the cam roller assembly for vertical reciprocation of the tube-inserting mechanism;

Figure 23 is an enlarged vertical sectional view taken along the lines 23—23 of Figure 7 and showing the pick-up finger, the pusher, the tube guide and related apparatus;

Figure 24 is a fragmentary horizontal sectional view taken along line 24—24 of Figure 23;

Figure 26 is a top plan view of the machine showing the details of the hopper for the caps;

Figure 27 is a fragmentary vertical section taken along the line 27—27 of Figure 26;

Figure 28 is a fragmentary top plan view on an enlarged scale of one portion of the hopper shown in Figure 26, and particularly showing the details of the track construction for feeding the caps into the tubes which direct them to the various cap-inserting stations;

Figure 29 is a fragmentary vertical sectional view taken along the line 29—29 of Figure 28;

Figure 30 is a horizontal sectional view of tube-guiding mechanism which may be employed on my machine when extra tall bottles are to be capped; this modification is not shown in the other views of the drawings;

Figure 1:
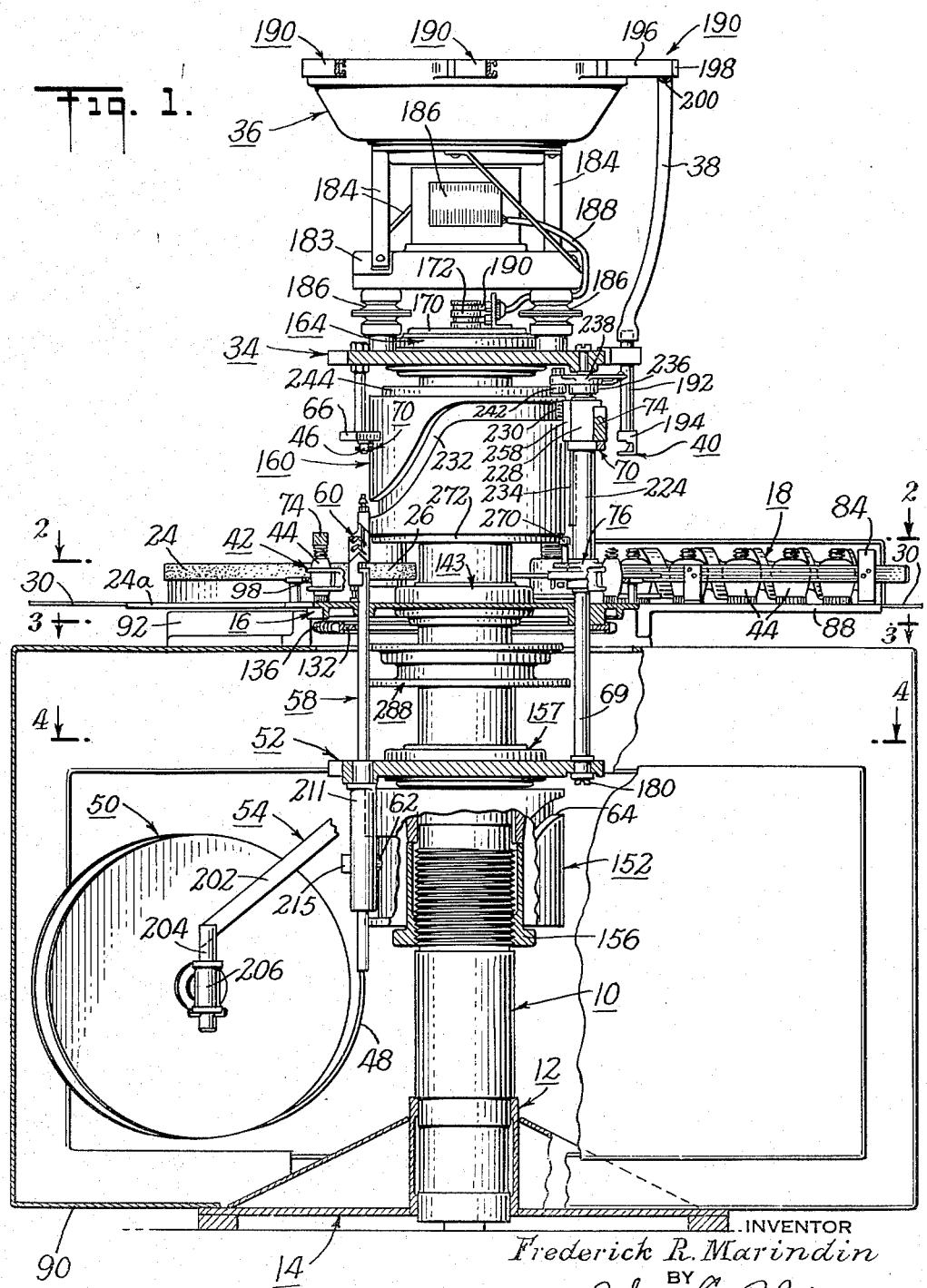
Figure 1 is a front elevation, partially in section, of the entire machine.

Figures 31A, 31B, 31C, 31D, 31E, and 31F are fragmentary vertical elevations of the mechanism shown in Figure 7 in the different positions of tube insertion and cap application graphically indicated by the corresponding letters in Figure 31.

Similar reference characters refer to similar parts throughout the several views of the drawings.

The machine here disclosed is especially adapted for assembling tubes in the aspirating valves of plug-caps and the insertion of such assembled caps in the necks of pliable bottles. However, obviously, many of its structural principles have broader application in the art of applying caps to containers of various types, all of which, where novel, are within the scope of this invention.

Figure 2:
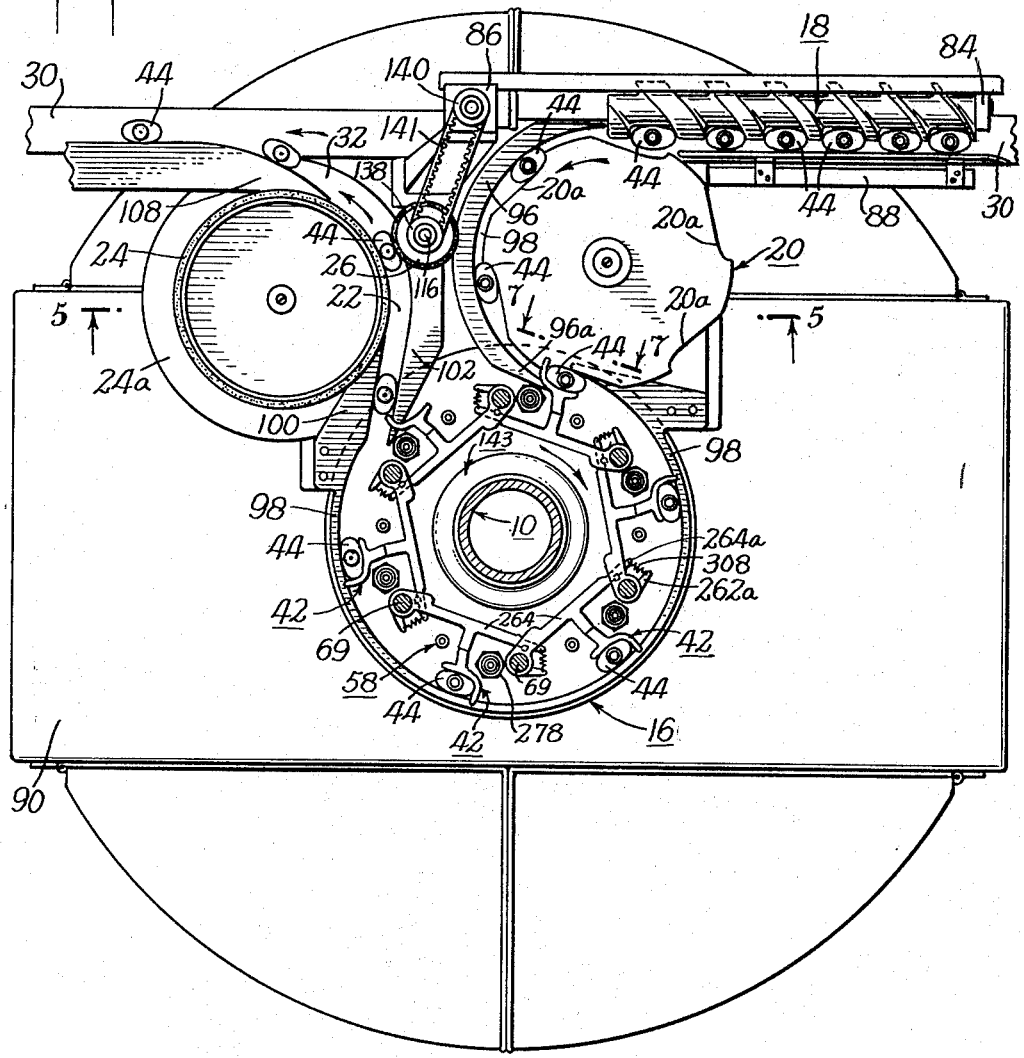
Figure 2 is a horizontal sectional view taken along the line 2—2 of Figure 1.

Referring now to the drawings in detail the general construction of the machine can be understood from a consideration of Figures 1 and 2. Thus, as shown in Figure 1, a central post 10 serves as a support for the apparatus and is seated in a socket 12 of a standard or base 14. A table 16 (Figures 1 and 2) is rotatably mounted on post 10 in position to receive bottles from a screw feed 18 and a star feeder wheel 20 (Figure 2). As shown in Figure 2 upon rotation of the screw feed 18, star feeder wheel 20 rotates in a counter-clockwise direction and table 16 in a clock-wise direction. Thus bottles 44 will feed along the screw conveyor to be picked up by the star feeder and delivered to the table where they are rotated in an arcuate path through roughly 300°. As will be presently described caps with aspirating tubes are inserted in the bottles while they travel in this manner on the table after which they are discharged to track 22 where they pass between the rotating drums 24 and 26 and are returned to a conveyor belt 30 by way of a track 32. During passage between drums 24 and 26 the bottles are test squeezed.

As can be seen in Figure 1, a plate 34 is supported on post 10 in a manner to be described in detail hereinafter. This plate supports a hopper 36 for the caps to be inserted in the bottles and, as will be described in detail hereinafter, vibrating apparatus is associated with the hopper 36 for feeding the caps therefrom to a plurality of tubes 38 where they are directed to horizontal platforms 40 (Figures 1, 7 and 16A). These platforms are located at six stations circumferentially spaced above the table 16 and, as can be seen in Figure 2, a plurality of hook members 42 are disposed immediately beneath these platforms and thus at the stations to pick up bottles from star feeder wheel 20; therefore when the machine is operating six bottles will be on the table, all being capped as they travel with the table from wheel 20 to the track 22.

This machine is designed to insert plug-type caps in bottles, and more particularly, caps having aspirating valves and associated tubes extending from the bottoms thereof. Referring to Figure 16A, the bottles 44 are here shown of the squeezable type, made from a suitable plastic such as polyethylene, although the machine may be used for other types of bottles and containers. Caps 46 are shaped and dimensioned to be inserted in the neck 44A of such bottles and they are driven to a home position by the machine, emerging therefrom with their top flanges 46A resting on the tops of the necks 44A. As better seen in Figure 16B caps 46 are hollow and have cylindrical valve sections 46b extending therefrom. Tubes 48 are seated in these valve sections 46b by the machine after which a proper length of such tube is severed as shown in Figure 16C and the cap together with its aspirating assembly is ready for insertion in bottle 44.

Tubing to be thus inserted in the caps is fed to each of the bottle capping stations from reels 50 (Figures 1 and 4) located beneath the table 16. As will be described in greater detail later, a plate 52 is rotatably supported on post 10 and bracket parts 54 extend therefrom to rotatably support reels 50 on shafts 56. Tubing from each reel is fed through a plurality of vertically disposed quills 58 slidably extending through table 16; such tubing is held against upward movement relative to the quills by pawls 60 (Figure 17) which, however, permit downward relative movement with respect to the quills. Quills 58 are provided with cam rollers 62 (Figure 16A) mounted in a cam groove 64 all as seen in Figures 1, 16A and 18 and as will be described in greater detail later. Thus the quills 58 reciprocate vertically and at the proper time insert tubing to the home position in the valve section 46b of the caps 46.

Turning now to Figures 1, 16A, 16B and 16C, a plurality of horizontally disposed anvils 66 depend from plate 34, one being located substantially above each of the bottle capping stations and in fact immediately above each of said quills 58, as can be seen in Figure 16A. Spaced from the anvils 66 are a corresponding number of posts 69 extending through table 16 (Figures 1 and 6) and connected at their opposite ends to plates 34 and 52. The relationship of each of cap-supporting platforms 40, anvils 66 and posts 69 can best be seen in Figures 9 and 10.

Apparatus for picking a cap from the cap-supporting platform (Figures 10 and 16A), moving it to a position beneath the anvil 66 (Figure 16B), then moving the cap with tube assembly to a position beneath a vertically reciprocal pusher 74 (Figures 7 and 9) and finally lowering the cap to a seated position in the bottle is all mounted on the posts 69; severing apparatus 68 (Figure 7) for cutting a proper length of tube after insertion in the cap is located adjacent thereto. A pick-up finger 70 (Figures 7 and 21) with an opening 70a and a spring-pressed pawl 72 adjacent thereto is pivotally mounted on post 69 as shown in Figure 10. Camming mechanism associated with pickup finger 70 pivots the finger about the post 69 to the position shown in full lines Figure 10 where it picks up a cap on the cap-supporting platform 40. Thence it moves to the dotted line position shown in that figure beneath anvil 66 (see also Figure 16B) for tube insertion and cutting.

More particularly, as seen in Figure 7, sleeves 78 are mounted on the table 16 to pivotally support about vertical axes knife member 80 with knife 81 and cutting member 82 associated with suitable camming mechanism located beneath the table 16. Knife member 80 and cutting member 82 are located above quill 58 (Figure 19) and when the quill 58 has withdrawn to the position shown in Figure 16C the tube is exposed and this mechanism is actuated to sever a desired length thereof. After this cutting operation pick-up finger 70 moves the cap with the tube applied thereto to the position immediately beneath the pusher 74 (Figure 9). Pusher 74 and pick-up finger 70 then move downwardly as a unit. Located therebelow is a semi-funnel shaped guide unit 76 also rotatably mounted for pivotal movement about post 69 as can be seen in Figures 7 and 13. As the pusher 74 moves the cap downwardly toward a bottle 44 positioned therebeneath, guide 76 moves over the bottle or from the full line position to the dotted line position of Figure 13. In this position it serves to guide the lower free end 48a (Figure 16C) into the neck of the bottle. Guide 76 then withdraws and the pusher continues its downward movement to seat the cap in the bottle there being a momentary pause in its downward movement when pick-up finger 70 withdraws. Pusher 74 then continues downward placing the cap in the final home position with its flange 46a resting on the top edge of the necks 44a.

A sequence of bottle capping operations will be briefly described with reference to Figures 31A through 31F. In Figure 31A the bottle is in a bottle-capping position on the table and the pick-up finger is in the process of picking up the cap from the cap-supporting platform (not shown in this figure). In the meantime the quill 58 is moving upwardly toward the anvil 66 (not shown in this figure). In Figure 31B the quill 58 has moved the tube further up toward the cap and the pick-up finger has moved the cap beneath the anvil 66. In Figure 31C the quill 58 has seated the end of the tube in the aspirating valve section 46b (Figure 16B) while in Figure 31D the quill has moved downwardly to expose the desired length of tube seated in the aspirating valve section and the severing apparatus 68 is in the process of cutting the tube. In Figure 31E the pick-up finger has moved the cap and tube to a position beneath the pusher 74 and the whole assembly has moved down toward the bottle, the guide 76 having come into position over the bottle neck to guide the free end of the tube into the bottle. In Figure 31F the pusher in the lowermost position having just driven the cap home to its final position in the neck of the bottle, with its flange 46a resting on the top edge of the bottle neck.

Bottle feeding apparatus

Referring to Figures 1 and 2, the screw feed 18 is rotatably mounted on a pair of uprights 84 and 86 above a platform 88 so that bottles may be received from the right as viewed in these figures by way of a conveyor belt 30 and then fed in evenly spaced relationship to the start feeder roll 20 as shown in Figure 2. The lower portion of the post 10 and associated parts is enclosed in a casing 90 as shown in Figure 1 and a table 92 is supported thereon as shown in Figures 2 and 5 for the support of wheel 20, drum 24 and associated parts. Thus the wheel 20 as shown in Figure 5 is rotatably supported in the table 92 by a suitable bearing construction 94. Wheel 20 has notches 20a regularly spaced about its periphery and shaped to pick up bottles from the end of screw feed 18, all as shown in Figure 2, and a guide plate 96 is suitably supported above table 92 (Figures 2 and 5) and spaced from the periphery of wheel 20 to provide a track 98 therebetween so that the wheel may guide the bottles from the end of the screw feed to the table 16 into the path of the hooks 42 which rotate with the table as described above.

As will be described more fully hereinafter hooks 42 are associated with mechanism for urging them outwardly so that as they move past the end 96a of the guide plate 96, they hook a bottle from one of the notches 20a and move it onto the table. A circular guide rail 98 extends from the table 92 (Figure 2) and substantially follows the periphery of the table 16 from the adjacent edge of the wheel 20 to a guide plate 100 secured to the other side of the table adjacent the drum 24; plate 100 forms the track 22 with a guide plate 102 which is also secured to table 92 and extends to drum 26. Accordingly bottles are picked up from the feeder wheel 20 by the hooks 42 and carried around by the table being held in definite position thereon between the hooks and the guide rail 98. Upon reaching the track 22 they pass between the drums 24 and 26 which are rotatably mounted on table 92 in bearings 104 and 106 respectively (Figure 5). Drums 24 and 26 are of such size as to provide a space therebetween smaller than the width of the bottles being capped. Consequently as the capped bottles pass between these drums they are automatically squeezed causing liquid therein to be aspirated from the apertures in the caps. Thus they may be checked by the operator of the machine for if liquid fails to appear as they pass between the drums 24 and 26 the bottle is rejected and picked off the line. Bottles then pass along the track 32 against the guide plate 108 to a conveyor belt 30 where they are carried away from the machine.

Figure 3:
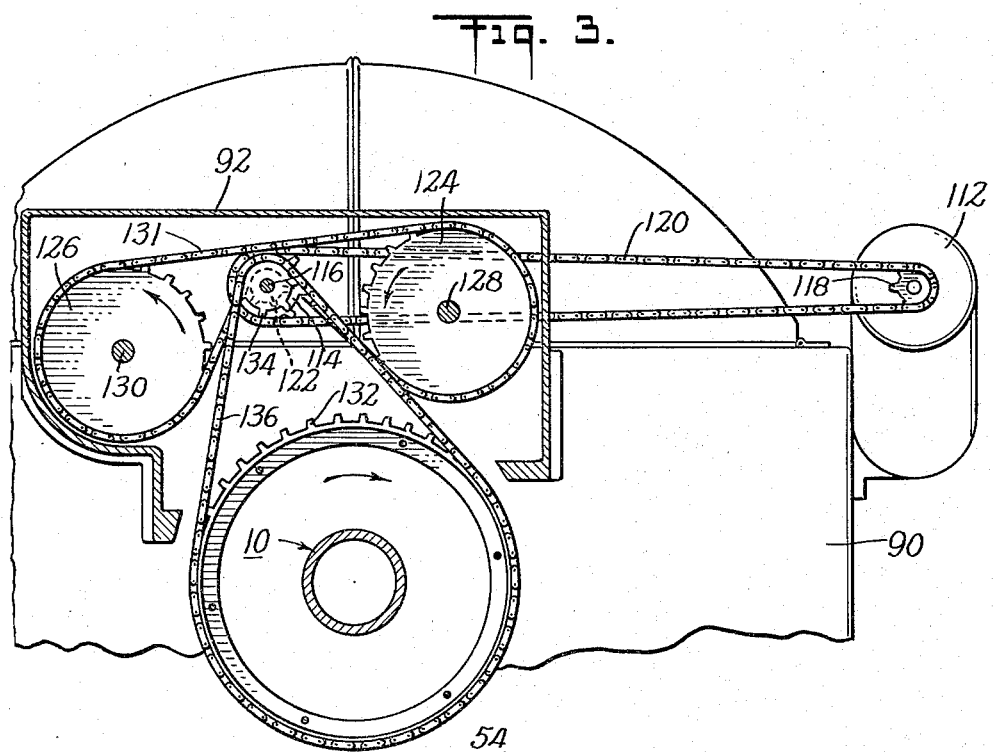
Figure 3 is a horizontal sectional view taken along the line 3—3 of Figure 1.

Referring now to Figures 3 and 5 a motor 112 suitably mounted on the casing 90 drives sprocket 114 (Figure 5) secured to shaft 116 which supports drum 26 and is journaled in bearing 106 as previously described. This drive is by way of a sprocket 118 on motor 112, a chain 120 and the sprocket 114. Above sprocket 114 on shaft 116 is a sprocket 122 for driving sprockets 124 and 126 connected to shafts 128 and 130 of star feed wheel 20 and drum 24, respectively all as can be understood from an examination of Figures 3 and 5. Drum 24 has an annular flange 24a (Figure 5) which picks up bottles from table 16 and guides them along track 22 (Figure 2). As indicated by the arrows in Figure 3 sprockets 124 and 126 and consequently wheel 20 and drum 24 are driven in the same direction by a chain 131 extending around one surface of sprocket 122 and all the way around sprockets 124 and 126. A sprocket piece 132 is secured to the underside of table 16 as shown in Figure 3 and is driven by a sprocket 134 secured to the shaft 116 by way of a chain 136. As can be seen in Figure 5 a sprocket 138 is secured to shaft 116 and a sprocket 140 (Figure 2) is connected to a suitable driving mechanism for the screw feed 18; sprockets 138 and 140 are connected by a driving chain 141. Thus upon operation of motor 112 screw feed 118 rotates to feed the bottles to star feeder wheel 20 which picks the bottles up and delivers them to the rotating table 16. The table carries them beneath the bottle-capping stations where caps are applied and then deposits them in the track 22 where they pass between the rotating drums 24 and 26 for a test squeeze and then are delivered to the conveyor belt 30 by way of track 32.

Cam assembly

Referring to Figure 6 a bearing 143 supports table 16 in a fixed position on post 10; bearing 143 has an inner-race 142 keyed to post 10 by rings 144 and 146 and outer-race 148 is held in position by a ring 150 screwed to the table. Thus while table 16 is free to rotate about the post 10 it may not be moved vertically with respect thereto.

A cam piece 152 fits about the post below table 16 and includes an upper neck portion 152a splined to the post by a key and slot connection 154 and a cam cylinder 152b depending from the neck portion and spaced from the post. Post 10 carries a nut 156 threaded thereon and abutting the lower edge of the neck portion 152a. Thus cam piece 152 is connected to the post 10 and held against rotation but may slide vertically with respect thereto. The upper section of the neck portion 152a carries a bearing 157 held in position by an annular ring 158 to rotatably support the plate 52 (Figures 1 and 6) on the cage member.

Still referring to Figure 6 a cam piece 160 has a neck portion 160a and a depending cam cylinder 160b spaced from the post. Cam piece 160 is splined to post 10 by a key and slot connection 162. A bearing 164 is interposed between a groove 34a in plate 34 and a reduced section 160c of cam piece 160. A ring 166 fitting in neck 160a rests on the top of the bearing to complete the assembly so that cam piece 160 is suspended from bearing 164. A ring member 167 is secured to the plate 34 and a cover 168 fits over the top of the post 10 and is secured thereto. A plate 170 is secured to the ring 167 to close the top of the post and a commutator 172 connected to a tube 174 splined to cover 168 by the key and slot connection 176 is seated in plate 170 by a bearing 171. Accordingly tube 174 and commutator 172 remain stationary as plates 34 and 170 and connected parts rotate thereabout during machine operation. A cable 178 extending up through the post 10 is connected to the commutator.

Posts 69 are connected to plate 52 by screws 180 and to plate 34 by screws 182 and accordingly plates 34 and 52 together with posts 69 form a unitary cage structure all of which rests upon nut 156. Posts 69 extend through table 16 but are not connected thereto, and as previously noted, table 16 is fixed to post 10 by rings 144 and 146. Thus table 16 remains stationary but plates 52 and 34 may be moved vertically relative thereto by adjusting nut 156 to accommodate bottles of different sizes, as will be presently described.

Cap feeding

Turning to Figure 1, hopper 36 is supported on a base 183 by four angularly disposed resilient straps 184. Base 183 is supported on plate 34 by shock absorbers 186 so that vibration of the hopper is not transferred to the plate 34 and the connected cage assembly. Still referring to Figure 1 the bottom of hopper 36 is connected to suitable electric vibrating mechanism 186 supported on base 182 and connected by a cable 188 and commutator brush 190 to commutator 172. Vibrating mechanism 186 is so designed and so connected to hopper 36 that it imparts rapid vibratory arcuate movement to the hopper. More particularly, upon energization of the vibrating mechanism the bottom of the hopper is twisted substantially around a vertical axis against the normal position of straps 184. Upon de-energization the springs pull the hopper back to normal position. This movement is very slight and very rapid being of sufficiently high frequency to create an audible hum.

In Figures 26 and 27 the shape of the interior of the hopper 36 is shown and it will be seen that the bottom thereof is slightly convex with a high center point 36a from which it recedes toward the lower peripherial interior and merges with the bottoms 188a of six spirally shaped tracks 188. Tracks 188 comprise square shaped ridges in the interior of the hopper as can be seen in Figure 27; bottoms 188b slant slightly toward the periphery or exterior of the hopper while the tops 188c merge with the guiding members 190. As will be presently described the guiding members 190 are designed to receive caps which are properly positioned on the tracks 188 and reject improperly positioned caps, allowing them to fall back into the hopper. The guiding members are connected to the flexible hoses 38 which in turn are connected to tubes 192 (Figure 1) extending through and secured to the plate 34, immediately above the various bottle capping stations. Cup members 194 are secured to the bottoms of tubes 192 and include platforms 40 for supporting and exposing plug caps to the pick-up finger 70 as previously described with reference to Figure 16A.

Referring now to Figures 28 and 29 guide members 190 comprise plates 196 and 198 having formed therein channels 196a and 198a respectively. At the entrance of guides 190 adjacent the tops 188c of tracks 188 and throughout the greater part of the length of the guides channel 196a is large enough to receive the flanged top 46a of a cap 46 while channel 198a is large enough to receive the body 46c of a cap but too small to receive the top flanged portion thereof. Channels 196a and 198a are sufficiently large and the guide is sloped to allow caps properly positioned therein to move therealong to the exit chute 200. At this point channels 196a and 198a are enlarged and the inner diameter of chute 200 is larger than the top flange portion 46a of the caps so they may slide therethrough and into the tubes 38 to be fed in proper order to the tubes 192.

In operation vibrating mechanism 186 impels plug-caps in the hopper 36 to move from the center 36a of the bottom toward the tracks 188 where they gradually move along such tracks to the guide members 90. As they approach the entrance of the guide members if their top flange portions 46a rest against the substantially vertical side walls 188d of the track they will be held in such position by the slant of the bottoms 188b thereof. If in this position as shown in Figure 28 upper flange portions 46a of the cap will be received into the enlarged channel 196a permitting the smaller body portion 46c of the caps to enter the channel 198a and such caps properly positioned pass through the guide member to the exit chute 200 and then to the tubes 38. However if caps are out of position such as caps o and p in Figure 28 they will not fit into the channels 196a and 198a and consequently they will be rejected and fall back into the lower portion of the hopper. Thus it will be seen that when the vibrating mechanism 186 is in operation caps are constantly fed up the six tracks 188 to the guide members 190 and those which are properly positioned with their body portion 46c facing the center of the hopper pass through the guide members and drop into the tubes with their body portions faced downwardly so they will be fed therethrough and arrive at the horizontal supporting platform 40 as shown in Figure 16A. From here they are properly exposed to be picked up by the pick-up finger 70 and then transferred to a position beneath the anvils 66 and shown in Figures 16A, 16B and 16C.

Tube feeding mechanism

Figure 4:
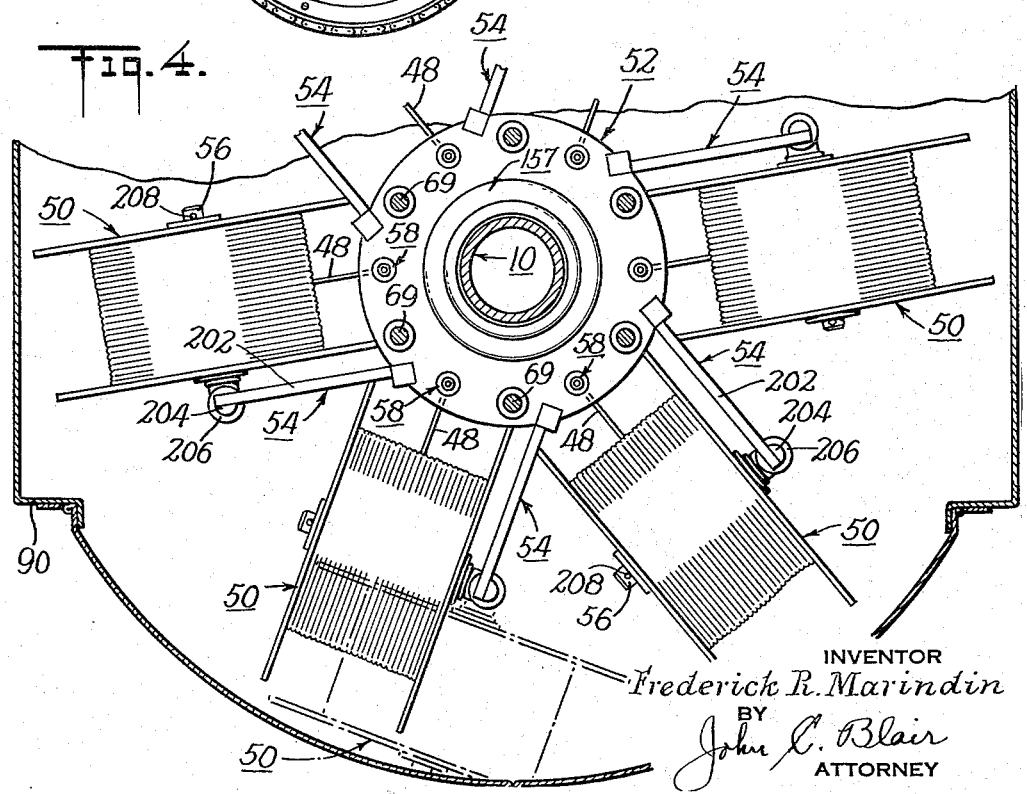
Figure 4 is a horizontal sectional view, partially fragmentary and taken along the line 4—4 of Figure 1.

As previously described the tube 48 is fed to each of the stations from a plurality of rolls 50 suspended from the plate 52 beneath the table 16 as shown in Figure 1. More particularly, as seen in Figure 4, supporting brackets 54 comprise an angularly depending bar 202 secured to a fitting 204 which is vertically disposed and connected to the shaft 56 by a shaft support 206. The reels 50 are rotatably supported on the shaft and held in such position by cotter pins 208. The tube from each of said reels is fed up through the quills 58 and past the pawls 60 and out through the nipples 210. Referring now to Figures 16A and 17, the pawl structure generally indicated at 60 comprises a holding plate 212 held on the upper end of quill 58 by the screw 214. There is a notch 216 formed in holding plate 212 for pivotally supporting the pawls 60 which are spring-pressed toward the tube by springs 218. The sharp edges 60a of the pawls are thus urged against the tube which is preferably a plastic such as polyethylene. Therefore such edges allow relative upward movement of the tube with respect to the pawls but they prevent any relative movement thereof in the opposite direction. As best seen in Figure 16A, the lower end of a screw 217 forms a stop against the table 16 for supporting the quills in their lowermost positions (see Figure 1).

Figure 19:
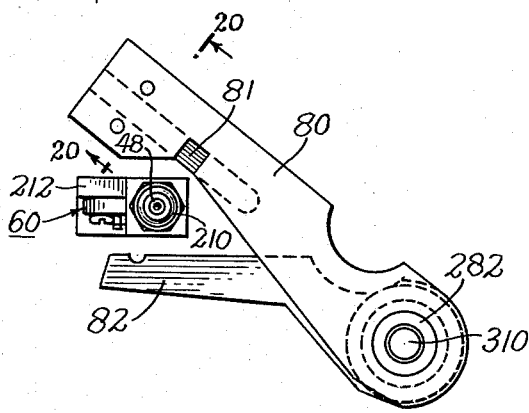
Figure 19 is a fragmentary enlarged horizontal section taken along the lines 19—19 of Figure 7 and showing the mechanism for severing a length of tube.
Figure 20:
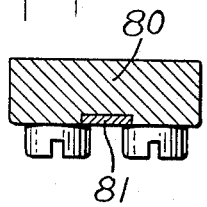
Figure 20 is a vertical sectional view taken along the lines 20—20 of Figure 19 and showing the details of the cutting blade.

The lower ends of quills 58 carry the cam rollers 62 (Figures 1 and 16A) riding in the cam track 64. Referring to Figure 18 the lower end of quill 58 is slidably supported in a sleeve 211 (see also Figure 1) and the stud shaft 213 for roller 62 is threaded into a support 215 secured to the quill by screws 219. Accordingly rotation of the table reciprocates the quills as rollers 62 follow the contour of track 64. The track is so shaped in timed sequence with the other bottle-capping operations that as a cap 46 reaches a position beneath anvil 66 and immediately above the nipple 210 of quill 58, the quill is in a position to drive the upper end of the tube 48 home into a seated position in the aspirating valve section 46b and to assure that the upper end 48b of the tube is flush with the bottom of the valve. Pawls 60 hold the tube fast during this operation. As the table rotates quill 58 moves away from anvil 66 or downwardly from the position shown in Figure 16B to the position shown in Figure 16C. During this downward movement the pawls 60 slide along the tube thus allowing relative movement between the tube and the quill until the parts reach the position shown in Figure 16C immediately below knife member 80 and cutting member 82 (Figures 16C and 19). The parts are thus in position for the cutting operation.

Cap pick-up mechanism

The mechanism for picking up a cap from the cap-supporting platform 40 (Figure 16A) delivering such cap to a position beneath the anvil 66 (Figures 31B and 16B) holding the cap in such position while the aspirating tube is inserted and the quill 58 is withdrawn to the cutting position (Figures 16C and 31D) and then delivering the cap to a position beneath the pusher 74 for insertion in a bottle (Figures 31E and 31F) will now be described. Inasmuch as the bottle-capping structure at each of the six stations on the table 16 is identical the details thereof will only be described at one station.

Post 69 is reduced at its lower end adjacent table 16 as shown in Figure 23 to form a shoulder 218 which supports a bearing sleeve 220 and a similar sleeve 222 is located at the top of the post. Bearings 220 and 222 rotatably support a sleeve 224 which can best be visualized by a consideration of Figures 9, 10, 23, 24, and 25; sleeve 224 runs substantially the length post 69, as shown in Figure 23. As seen in Figures 9, 23, 24, and 25 a sleeve 226 fits about sleeve 224 and has a top annular flange 226a resting upon a follower block 228 (Figures 23, 24, and 25) which fits thereabout. Follower block 228 is supported by a cam roller 230 in a cam groove 232 formed in the upper cam piece 160 (Figure 1) to effect vertical reciprocation in a manner to be presently described. Thus post 69 has rotatably mounted thereon a sleeve 224 which in turn has a sleeve 226 mounted thereon and which is supported by a follower block 228 in turn supported by a cam roller 230 in a cam groove 232.

Figure 25:
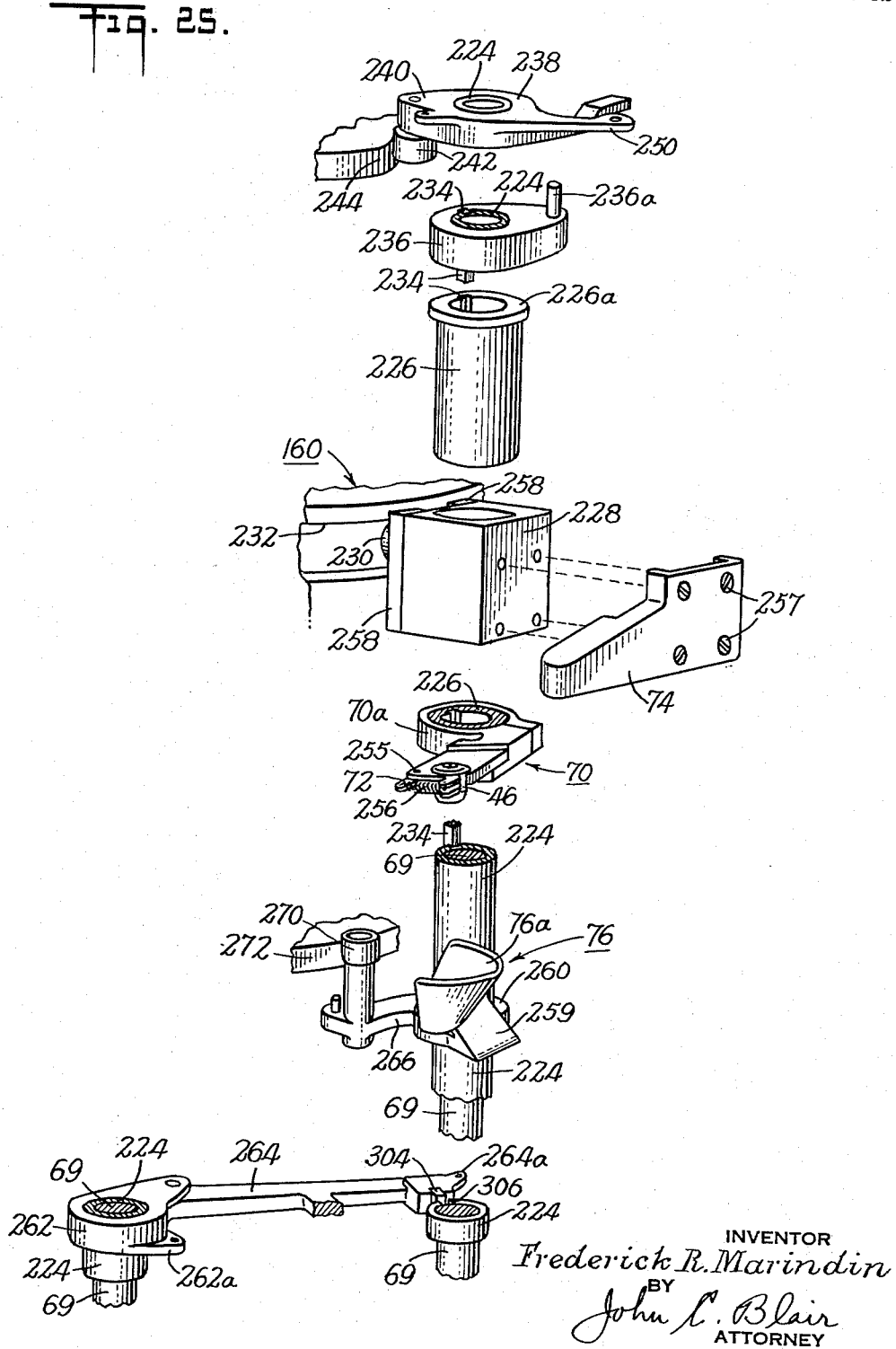
Figure 25 is an exploded perspective showing further the details and interrelationships of the apparatus shown generally in Figures 7 and 23 and the relation of those parts to each other.

Referring now to Figures 23, 24 and 25, sleeves 224 and 226 are splined by a key and slot connection 234 so that they may rotate about post 69 as a unit. A lever 236 is splined to sleeve 224 by the key and slot connection 234 to rotate therewith and with sleeve 226 as a unit. Immediately thereabove is the cam arm 238 (Figures 7, 8, 23 and 25) which is rotatably mounted on sleeve 224 (Figure 23) and hence is free to pivot about the post 69 as an axis. As can best be seen in Figures 7, 8 and 25, lever 238 carries on one end 240 a cam roller 242 engaging a cam surface 244 formed on the upper surface of cam piece 160 (Figures 1, 8 and 25). Cam roller 242 on arm 238 is urged against the cam surface by a spring 246 connected thereto and connected by a screw 248 (Figures 7 and 8) to the lower surface of plate 34. The other end 250 of cam arm 238 is connected to the end 236a of lever 236 by a spring 252. Accordingly during rotation of table 16 and plate 34 about the cam piece 160 cam roller 242 will follow the convolutions of cam surfaces 244 to impart corresponding motion to sleeves 224 and 226 by way of the arm 238 through spring 252.

Figure 21:
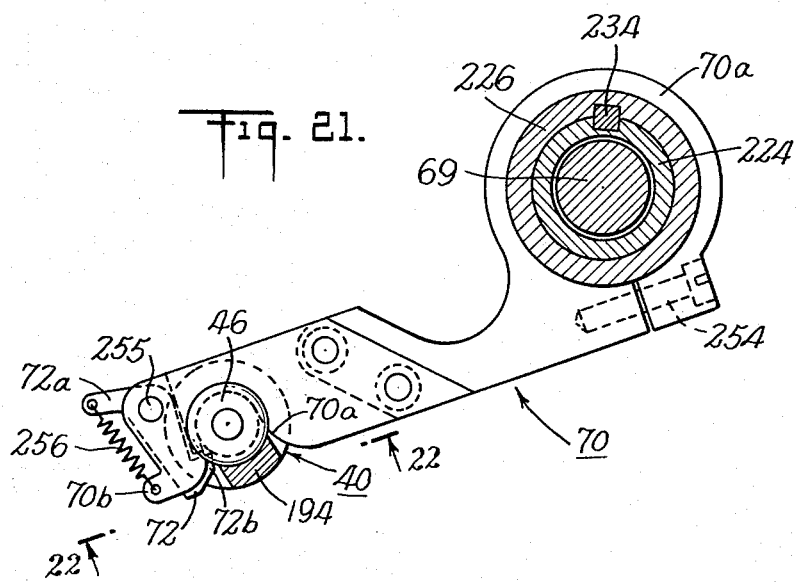
Figure 21 is an enlarged fragmentary horizontal view taken along the lines 21—21 of Figure 7 and showing the details of construction of the pick-up finger.
Figure 22:
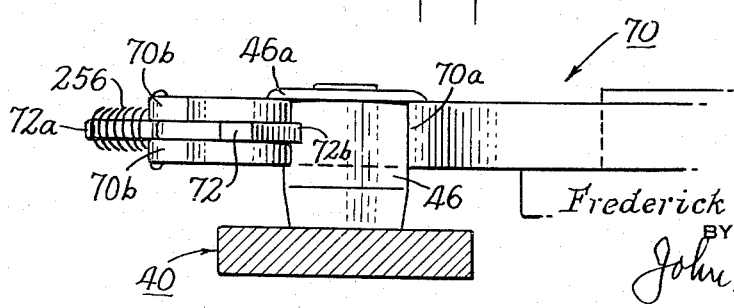
Figure 22 is an enlarged fragmentary vertical sectional view taken along the line 22—22 of Figure 21.

Referring now to Figures 21, 23 and 25, pick-up finger 70 includes a collar portion 70a secured to sleeve 226 by way of a screw 254 and consequently the motion imparted to sleeve 226 by way of the arm 238 is imparted to the pick-up finger. The other end of the pick-up finger as shown in Figure 21 includes the pawl 72 pivoted about the pin 255 with an extension 72a connected to an outwardly extending extension 70b of pick-up finger 70 by a spring 256. Pawl 72 is urged in a counter-clockwise direction as viewed in Figure 21 and the projection 72b thereof is shaped and positioned to partially fit about a cap 46 when it is inserted therein. Thus, as seen in Figure 22, a cap 46 may be picked up by the finger and held with its open end facing down ready for tube insertion. However, the pawl 72 is shaped and positioned to permit release of a cap after it has been inserted in a bottle as has been previously described. Accordingly, arm 238, through spring 252, sleeves 224 and 226 by way of lever 236 moves pick-up finger 70 to the supporting platform 40 (Figure 16A) to pick up a cap, then to the anvil 66 (Figures 16B and 16C) for tube insertion and cutting and finally back under the pusher 74 (Figures 9 and 31E) for insertion in a bottle in a manner to be described.

Cutting mechanism

As has been previously described knife member 80 and cutting member 82 (Figures 7, 11 and 19) are mounted on the vertical sleeve 78 which is secured to the table 16 by nut 278 threaded therein. As can be seen in Figure 12, sleeve 278 carries two sleeves 280 and 282 connected, respectively, to cutting member 82 and knife member 80. Sleeve 280 is connected to a cam arm 284 (Figure 12) while sleeve 282 is similarly connected to a cam arm 286 immediately therebelow. Thus sleeves 280 and 282 extend through the sleeve 78 and through table 16 to be connected to the cam arms 284 and 286 located beneath the table as can also be seen in Figure 7. A cam plate 288 is connected to post 10 and thus supported beneath the table 16 adjacent the cam arms 284 and 286. As better seen in Figure 15, cam plate 288 includes a ring 291 spaced from the post 10 and having oppositely disposed vertical cam surfaces 290 and 292. Referring still to Figure 15, arm 284 includes an inwardly extending section 294 having a vertically depending portion 294a (Figure 7) carrying a cam roller 296 for engagement with cam surface 290. Cam arm 286 has an inwardly extending section 298 which carries a cam roller 300 for engagement with cam surface 292.

All of cam arms 284 and 286 have forwardly extending extensions 284a and 286a which are alternately connected. Thus extension 286a in Figure 15 is connected to the adjacent circumferentially spaced extension 284a to the left. By this alternate interconnection of cam arms 284 and 286 through the springs 302 the arms and hence the cam rollers 296 and 300 are urged against the opposite sides of the cam ring, i.e. against the cam surfaces 290 and 292. Inasmuch as sleeves 280 and 282 (Figure 12) are carried by the sleeve 78 mounted on the table 16, these cam arms 284 and 286 move with the table along the cam ring 288, the surfaces of which thereby impart corresponding pivotal movement of the sleeves 280 and 282 to actuate knife member 80 and cutting member 82. Accordingly when quill 58 has properly seated the end of the tube in the cap as previously described (Figures 16B and 31C) and has then moved downwardly to expose a desired length of tube (Figures 16C and 31D) knife member 80 and cutting member 82 will be actuated to sever the tube after which the parts return to the open position shown in Figure 19 so that the tube and caps may continue to descend to be inserted in the bottle at the station therebelow.

Cap inserting mechanism

Referring now to Figures 7, 9, 23 and 24 pusher 74 is secured to follower block 228 by screws 257 (Figure 7) and a pair of plastic blocks 258 are secured thereto and interposed between the follower block and the surface of cam piece 160 to prevent radial movement of the blocks with respect to the axis of the post 69. Consequently, follower block 228 and the attached pusher 74 may move axially with respect to post 69 according to the shape of cam track 232 (Figures 1 and 23) but these parts are held against any radial movement by the blocks 258.

Upon completion of insertion of the tube 48 in the cap 46 and severing thereof at proper length (Figure 16C) pick-up finger 70 moves the cap assembly to a position immediately beneath pusher 74 and immediately the inserting assembly including the pick-up finger 70, the pusher 74, cap 46 with the tube 48 properly inserted therein start a downward descent along post 69 toward the neck of a bottle stationed therebelow for insertion therein.

Prior to cap insertion, it is necessary to be sure that the free end of the tube 48 (Figure 16C) is properly guided into the neck of the bottle and guide 76 (Figures 7, 13, 23 and 25) performs this function. Referring to Figures 7 and 23 guide 76 includes the semi-funnel shaped portion 76a and arm 259 depending therefrom terminating in a collar portion 260 fitting about sleeve 224 and resting upon the collar section 262 (Figures 7 and 23) of arm 264. As best seen in Figures 13 and 25 a cam arm 266, which is preferably an integral part of the guide 76, extends from the collar 260 rearwardly and has a vertical extension 268 carrying a cam roller 270 for engagement with a cam surface 272 on the lower edge of the cam piece 160 (Figure 1). Arms 266 are interconnected by springs 274 as can be seen in Figure 13 and thus these springs urge all of the cam rollers 270 against the cam surface 272 so that the guides 76 move about posts 69 from the full line position shown in Figure 13 to the dotted line position immediately above a bottle at the proper moment for guiding the free end of the tube 48 (Figure 16C) into the neck of a bottle. Thus as the pusher 74 and the finger 70 with cap and tube assembly move downwardly from the position shown in Figure 31D to a position immediately before that shown in Figure 31E guide 76 pivots to guide the free end of the tube 48 into the neck of the bottle after which it withdraws to make way for the pusher. Pusher 74 continues downward until the cap is partly seated in the bottle when there is a momentary pause and finger 70 pivots out of the way. Finally the pusher drives the cap to the full seated home position.

*Lockout on failure of bottle-feeding mechanism*

Referring now to Figures 2 and 14, arms 264 which are preferably integral with hooks 42 are pivotally mounted on post 69 immediately above table 16. Extending from the ends of arms 264 are key sections 304 formed in the bottom por-facing slots 306 (Figure 25) formed in the bottom portion of the sleeve 224. The ends 264a of the arms 264 are connected to extensions 262a of adjacent collar sections 262 by springs 308. Hence the arms 264 are interconnected by these springs 308 and the ends 264a are urged toward the sleeves 224 so that key sections 304 are seated in slots 306, as shown to the right of Figure 14, unless there is a bottle interposed between hook 42 and guide rail 98 (Figures 2 and 14). When key section 304 is in such position sleeve 224 is prevented from any pivotal movement about post 69. Accordingly during table rotation cam arm 238 continues to follow cam surface 244 (Figure 8) but due to the spring connection between the end 250 thereof and lever 236 such movement is confined the cam arm and sleeve 224 remains stationary.

Consequently, if for any reason a hook 42 does not pick up a bottle from the star feeder wheel 20 when it passes that wheel, spring 308 will hold key section 304 in slot 306 to prevent movement of the sleeves 224 and 226. As has previously been described, pick-up finger 70 is keyed to sleeve 226 and consequently it will not move over to the cap-supporting platform 40 (Figures 10 and 16A) to pick up a bottle cap but will remain in the position immediately beneath the pusher 74. Thus as the empty hook moves around the table the quill 58 will move up finally to the position shown in Figure 16C but due to the fact that the pick-up finger 70 has not picked up a cap, no cap will be beneath anvil 66 and consequently the end of the tube 48 will not be seated in an aspirating valve 46b (Figure 16B) and the quill moves down without leaving a length of tube in the upper position. Subsequently, the pusher 74 will move downwardly in the usual manner but there being no cap there-beneath nothing will happen at this empty station. On the other hand, if a hook 42 picks up a bottle from the star feeder wheel 20 and moves it against the guide rail 98 the arm 264 connected to this hook moves in a counter-clockwise direction as viewed in Figure 14 to move the key 304 out of slot 306. Accordingly, sleeves 224 and 226 are free to pivot about post 69 and pick-up finger 70 operates to pick up a cap, deliver it beneath the anvil 66 (Figures 16B and 16C) and thence to pusher 74 all as has been previously described.

*Adjustment for bottles of different sizes*

The machine as shown is adjusted to insert plug-caps in bottles of the height shown in Figure 7, i.e. cam track 232 (Figures 1 and 7) on cam piece 160 is so related to the top surface of table 16 that pusher 74 will descend just far enough to drive the plug-caps home to the seated position with the top flange portion 46a resting upon the top edge of the neck of the bottle. Should it be desired however to use taller bottles this may be accomplished by a simple adjustment.

Referring to Figure 1, this adjustment is made by turning the nut 156 which as previously described, supports the entire cage structure including plates 52 and 34, posts 69, cam pieces 152 and 160 and mechanism associated therewith. Thus assuming it is desired to cap bottles of greater height nut 156 is screwed counter-clockwise as viewed in Figure 1 which raises cam piece 152, plate 52, plate 34 and cam piece 160. This, of course, not only raises cam groove 232 further from the top of table 16 (Figure 1) but also all of the parts connected to the post 69 which as will be seen in Figures 7 and 25 include sleeve 224, sleeve 226, follower block 228, pusher 74, pick-up finger 70 and related mechanism, as well as cam piece 152 and quills 58. As previously described tubes 192 (Figure 1) are connected to and depend from the lower side of plate 34 which is moved upwardly by the same adjustment of nut 156. Accordingly, all of the apparatus for feeding the caps to the pick-up position (Figure 16A) picking up the caps and inserting the tubes (Figures 16B and 16C) and inserting the caps in bottles after severing (Figures 7, 25 31E and 31F) are simultaneously adjusted upwarddly. The operation of the machine is identical with that described above except that the pusher 74 will not descend as far because cam track 232 has been raised with respect to the table 16. Accordingly taller bottles may be accommodated. However, severing mechanism 68 (Figure 7) remains in the same position on the table and hence longer lengths of tube will be cut to fit in the taller bottles. Thus it will be seen that this is a simple and practical provision for quickly adjusting the machine to accommodate a variety of bottles of different heights.

Where tall bottles are being capped and longer tubes are inserted in the bottles, bottle guide 76 (Figure 7) has sometimes been found unsuited to assure proper guidance of the free end of such long tubes into the bottles. In order to assure proper feeding of such free ends the modification shown in Figure 30 may be employed. When pusher 74 moves downwardly and guide 76 moves over the bottle long tubes have a tendency to wag too much. Referring to Figure 30 arm 309 moves at this time counter-clockwise from the position shown in full lines to the dotted line position immediately above a bottle and in so doing guides the tubes so that the free end thereof may move into the neck of the bottle.

More specifically as seen in Figure 12 a rod 310 is rotatably supported in sleeve 78 and is connected at its upper arm 309. The lower end of rod 310 is connected to a cam arm 312 (Figures 7, 12 and 15) having a stud shaft 314 depending from its inner end to support a cam roller 316 in engagement with a cam surface 318 of cam plate 288 (Figure 7). Cam arm 312 is urged against the cam surface 318 by a spring 320 (Figure 15) anchored at 321 to table 16 and therefore arm 312 swings or pivots rod 310 and consequently arm 309 according to cam surface 318.

Returning to Figure 30 a catch member 322 is pivoted on the end of arm 309 by a pin 324 and is resiliently supported therebeneath by a spring 326; a notch 322a in catch member 322 is immediately beneath a similar notch 309a in arm 309. The shape of the notches 309a and 322a together with the resilient action of catch member 322 facilitates the picking up of the tube attached to the cap at the tube-inserting station beneath the anvil 66 (Figure 16B) just before severing. This serves to support the tube sufficiently so that the end thereof engages the guide 76 to be threaded into the neck of the bottle.

I claim:

1. In apparatus for applying caps to the openings of containers wherein such caps include atomizing apparatus comprising valve means with a tube fitted thereto, the combination of a stationary central supporting post, a pair of plates rotatably mounted on said post and axially spaced from each other, a plurality of rod members connecting said plates to hold them in such spaced relationship so that they may rotate about said post as a unit, a table rotatably mounted on said post and interposed between said plates, said rods being slidably related to said table, container capping apparatus mounted on the plate above said table, means for feeding containers to said table at regularly spaced intervals for capping by said apparatus, and means for adjusting the vertical position of said plate assembly with respect to said table so as to accommodate different heights of bottles.

2. The combination defined in claim 1 in which there is a cage assembly supported on said central post and carrying a plurality of cam surfaces associated with said container capping apparatus to actuate it upon rotation of said plates about said post.

3. The combination defined in claim 1 in which the container capping apparatus includes means for feeding caps to a capping position adjacent each container together with a pusher for applying said caps to said containers by vertical movement, and a cage assembly including cam means associated with said cap positioning means and said pusher for actuating both in timed sequence.

4. In apparatus for applying caps to containers having atomizing apparatus comprising valve means and a tube applied thereto for aspiration of liquid, the combination of a rotatable table, a central support for said table, means for feeding containers to said table at regularly spaced intervals, means for rotating said table, means for feeding caps to a station above said table, a substantially vertical post, means for supporting said post on said table, a pusher slidably mounted on said post, a pick-up finger rotatably mounted on said post, a cam associated with said central support and said pick-up finger and shaped to pivot said pick-up finger about said post so that it may pick-up a cap and move it to a position beneath said pusher, means for vertically reciprocating said pusher to apply caps to containers on said table, and means for rendering said pick-up finger inoperative when a container is not properly positioned on said table for proper application of a cap by said pusher.

5. In apparatus for applying caps to containers, in combination, means for feeding containers in a path at regularly spaced intervals to a cap-applying station, a vertical post positioned to one side of said path of said containers and adjacent said station, cap-applying means associated with said post adapted to pick-up successive caps and apply them to said containers when they reach said station, a locking arm pivotable about a vertical axis, and spring means adapted to urge said arm into a locking position on said post to prevent operation of said cap-applying means, said locking arm having a projection in the path of said containers shaped and positioned to be pushed by said containers to an unlocking position when each container arrives at said station.

6. The combination defined in claim 5 wherein said cap-applying means includes a swinging pick-up arm and a pusher, said pick-up arm being pivoted on said post and adapted to move successive caps under said pusher for application to said containers.

7. The combination defined in claim 5 in which said cap-applying means includes a pick-up arm swingably supported on said post and a pusher slidably mounted for vertical reciprocation on said post, said pick-up arm adapted to move successive caps under said pusher, and means adapted to vertically reciprocate said pusher to apply said caps to said containers.

8. The combination defined in claim 7 in which said projection is shaped to block containers as they move in said path to position them at said station while moving to the unlocking position to permit operation of said pick-up arm.

9. In apparatus for assembling a cap and a tube for insertion into a container wherein such a cap includes an atomizer, the combination of a rotatable table, a stationary central support rotatably supporting said table and having cam surfaces, a quill reciprocable along a vertical axis, said quill being slidably supported by said table, an upwardly extending vertical post mounted on and adjacent the periphery of said table, a horizontally movable arm slidably mounted on said post, a cap holder secured to said arm, a cam follower engaging one of said cam surfaces and connected to said quill, a cam follower engaging the other of said cam surfaces and connected to said arm to horizontally move said arm and holder in timed relation to said quill, means for feeding a cap to said holder, means for feeding a tube to said quill, and pawl means in said quill to prevent downward movement of a tube relative to said quill whereby said arm moves a cap from said feeding means to center said cap on said axis and said quill then moves upwardly in timed relation to insert a tube into said cap.

10. Apparatus as defined in claim 9 wherein there is an anvil member spaced above said table and intersecting said quill axis whereby said arm positions said cap under said anvil prior to the insertion of said tube therein.

11. In apparatus for assembling containers having an atomizing valve cap and a dip tube attached to said cap, the combination of a rotatable table, a vertical central support for rotatably supporting said table, said support having a cam surface thereon, an upwardly extending vertical post secured to and adjacent the periphery of said table, an arm slidably mounted on said post, a cap holder on said arm for receiving and holding said cap with its attached tube extending downwardly, a vertically reciprocable pusher mounted on said post above said arm, means for supplying a cap and tube assembly to said cap holder, a cam follower engaging said cam surface and connected to said arm to move said cap and tube from said means to a position under said pusher, and a cam follower engaging said cam surface and connected to said pusher whereby said pusher is actuated in timed relation to said arm to insert said cap and tube into said container.

12. Apparatus as defined in claim 11 wherein there is a container clamp pivotally mounted on said post and a cam follower engaging said cam surface and connected to said container clamp whereby a container is received and held in timed relation to the operation of said cap holder and said pusher.

13. Apparatus as defined in claim 11 wherein the cam surface engaged by said cam follower connected to said pusher is adapted to provide a pause in said pusher's downward movement after partial insertion of said cap whereby said cap holder releases said cap and said cap is permitted to resiliently position itself before final insertion by said pusher.

14. In apparatus for assembling containers having an atomizing valve cap and a dip tube attached to said cap, the combination of a rotatable table, a vertical central support for rotatably supporting said table, said support having camming surfaces thereon, an upwardly extending vertical post secured to and adjacent the periphery of said table, an arm slidably mounted on said post, a cap holder on said arm adapted to receive and hold a cap, a quill vertically reciprocable along a vertical axis, said quill being slidably supported by said table, means for feeding a tube to said quill, means for feeding a cap to said holder, a horizontally extending vertically reciprocable pusher mounted on said post above said arm, and cam followers connected to said quill, said arm and said pusher and engaging said camming surfaces whereby said arm and cap holder position a cap on said axis above said quill, said quill moves upwardly to insert a tube into said cap, said arm then moving horizontally to align said cap and tube below said pusher and over the opening of a container on said table, said pusher and arm then descending to insert said cap and tube into the container opening.

15. Apparatus as claimed in claim 14 wherein there is an anvil member secured to said table, closely spaced above the horizontal path of said cap holder and intersecting said quill axis.

16. Apparatus as defined in claim 14 wherein said cam surface engaged by the cam follower connected to said pusher is adapted to provide a pause in said pusher's downward movement after partial insertion of said cap whereby said cap holder releases said cap and said cap is permitted to resiliently position itself before final insertion by said pusher.

17. In apparatus for assembling containers having an atomizing valve cap and a dip tube attached to said cap, the combination of a rotatable table, a central support rotatably supporting said table and provided with camming surfaces thereon, an upwardly extending vertical post secured to and adjacent the periphery of said table, a quill reciprocable along a vertical axis, said quill being slidably supported by said table, a horizontally extending vertically reciprocable pusher mounted on said post, a cam follower engaging one of said cam surfaces and connected to said quill, another cam follower engaging the other cam surface and connected to said pusher, and means in timed relation to the reciprocation of said quill and said pusher for receiving and holding a cap whereby said means centers a cap on said axis, said quill moves upward to insert a tube into said cap, said means then positioning said cap and attached tube over a container opening and below said pusher, said pusher then descending to insert said cap and tube into the container opening.

18. In apparatus for assembling a container having an atomizing cap with a tube attached to said cap, in combination, a vertical shaft, a vertically reciprocable horizontally extending pusher mounted on said shaft, a horizontally extending arm slidably mounted on said shaft, a cap holder on said arm, said cap holder including means forming a vertical slot through said arm, a lever pivotally mounted on said arm adjacent said slot, a spring connected to said arm and lever limitedly urging said lever horizontally into said slot, and cam means actuating said arm and said pusher in timed relation whereby horizontal movement of said slot about the cap permits said slot and lever to resiliently receive and hold said cap for positioning below said pusher during downward movement of said pusher to insert said cap and tube into the container opening.

References Cited in the file of this patent

UNITED STATES PATENTS

| | | |
|---|---|---|
| 904,879 | Kirkegaard | Nov. 24, 1908 |
| 948,688 | Kirkegaard | Feb. 8, 1910 |
| 1,262,993 | Stewart | Apr. 16, 1918 |
| 1,303,581 | Nordstrom | May 13, 1919 |
| 1,348,341 | Winkley | Aug. 3, 1920 |
| 1,629,170 | Matthias | May 17, 1927 |
| 1,698,030 | Smith | Jan. 8, 1929 |
| 1,775,255 | Risser | Sept. 9, 1930 |
| 2,036,796 | Markus et al. | Apr. 7, 1636 |
| 2,066,259 | Everett | Dec. 29, 1936 |
| 2,160,992 | Thomas | June 6, 1939 |
| 2,218,870 | Brodbeck | Oct. 22, 1940 |
| 2,269,658 | George | Jan. 13, 1942 |
| 2,270,300 | Mothersall | Jan. 20, 1942 |
| 2,507,072 | Weber | May 9, 1950 |
| 2,579,404 | Stevenson | Dec. 18, 1951 |
| 2,585,559 | Lakso | Feb. 12, 1952 |
| 2,706,847 | Jennings | Apr. 26, 1955 |
| 2,710,714 | Worth | June 14, 1955 |
| 2,781,576 | Jennings | Feb. 19, 1957 |
| 2,800,702 | Abplanalp | July 30, 1957 |